US010636585B2

(12) United States Patent
Tang et al.

(10) Patent No.: US 10,636,585 B2
(45) Date of Patent: Apr. 28, 2020

(54) METHOD FOR MANUFACTURING STACK OF GRAPHENE AND CARBON NANOTUBE, ELECTRODE MATERIAL INCLUDING STACK OF GRAPHENE AND CARBON NANOTUBE, AND ELECTRIC DOUBLE-LAYER CAPACITOR USING THE SAME

(71) Applicant: NATIONAL INSTITUTE FOR MATERIALS SCIENCE, Ibaraki (JP)

(72) Inventors: Jie Tang, Ibaraki (JP); Kun Zhang, Ibaraki (JP); Jing Li, Ibaraki (JP); Jinshi Yuan, Ibaraki (JP); Luchang Qin, Ibaraki (JP); Norio Shinya, Ibaraki (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 33 days.

(21) Appl. No.: 16/085,689

(22) PCT Filed: Sep. 21, 2016

(86) PCT No.: PCT/JP2016/077866
§ 371 (c)(1),
(2) Date: Sep. 17, 2018

(87) PCT Pub. No.: WO2017/163464
PCT Pub. Date: Sep. 28, 2017

(65) Prior Publication Data
US 2019/0115164 A1 Apr. 18, 2019

(30) Foreign Application Priority Data
Mar. 22, 2016 (JP) .................................. 2016-057675

(51) Int. Cl.
*H01G 11/36* (2013.01)
*H01G 11/86* (2013.01)
(Continued)

(52) U.S. Cl.
CPC .......... *H01G 11/36* (2013.01); *C01B 32/184* (2017.08); *H01G 11/06* (2013.01); *H01G 11/24* (2013.01);
(Continued)

(58) Field of Classification Search
CPC ........ H01G 11/36; H01G 11/06; H01G 11/24; H01G 11/26; H01G 11/50; H01G 11/52;
(Continued)

(56) References Cited

U.S. PATENT DOCUMENTS

2009/0092747 A1  4/2009  Zhamu et al.
2011/0291068 A1* 12/2011  Kobayashi ........ H01L 29/66742
                                           257/9
(Continued)

FOREIGN PATENT DOCUMENTS

EP      2 769 960       8/2014
JP      2009-199960     9/2009
(Continued)

OTHER PUBLICATIONS

International Search Report dated Dec. 6, 2016 in International Application No. PCT/JP2016/077866.
(Continued)

*Primary Examiner* — Dion Ferguson
(74) *Attorney, Agent, or Firm* — Wenderoth, Lind & Ponack, L.L.P.

(57) ABSTRACT

Provided are a novel method for manufacturing a stack of carbon nanotube and graphene that can improve a capacitor characteristic, an electrode material including the stack of carbon nanotube and graphene, and an electric double-layer
(Continued)

capacitor using the same. A method for manufacturing a stack of graphene and carbon nanotube includes a step of dispersing the graphene in an aqueous MOH solution (M represents an element selected from a group consisting of Li, Na, and K) to adsorb MOH on the graphene, a step of heating the graphene with MOH adsorbed thereon that is obtained in the adsorption step in vacuum or in an inert atmosphere in a temperature range of 400° C. or more and 900° C. or less to form pores in the graphene, and a step of dispersing the carbon nanotube and the graphene with the pores that are obtained in the step of forming the pores in a dispersion medium to stack the carbon nanotube and the graphene with the pores.

19 Claims, 20 Drawing Sheets

(51) Int. Cl.
      *H01G 11/62*      (2013.01)
      *C01B 32/184*    (2017.01)
      *H01G 11/06*      (2013.01)
      *H01G 11/24*      (2013.01)
      *H01G 11/26*      (2013.01)
      *H01G 11/50*      (2013.01)
      *H01G 11/52*      (2013.01)
(52) U.S. Cl.
      CPC ............. *H01G 11/26* (2013.01); *H01G 11/50* (2013.01); *H01G 11/52* (2013.01); *H01G 11/62* (2013.01); *H01G 11/86* (2013.01); *Y02E 60/13* (2013.01)
(58) Field of Classification Search
      CPC ...... H01G 11/62; H01G 11/86; C01B 32/184; Y02E 60/13
      See application file for complete search history.

(56) References Cited

U.S. PATENT DOCUMENTS

| | | |
|---|---|---|
| 2013/0202945 A1 | 8/2013 | Zhamu et al. |
| 2013/0295374 A1 | 11/2013 | Tang et al. |
| 2013/0309776 A1 | 11/2013 | Drndic et al. |
| 2015/0238929 A1 | 8/2015 | Wei et al. |
| 2015/0291431 A1 | 10/2015 | Tang et al. |
| 2015/0380176 A1 | 12/2015 | Seo et al. |
| 2016/0093449 A1* | 3/2016 | Yoon ...................... H01G 11/24 361/502 |
| 2017/0221645 A1* | 8/2017 | Gangopadhyay ...... H01G 11/24 |

FOREIGN PATENT DOCUMENTS

| | | |
|---|---|---|
| JP | 2012-15481 | 1/2012 |
| JP | 2013-151392 | 8/2013 |
| JP | 2014-199746 | 10/2014 |
| JP | 2014-220327 | 11/2014 |
| JP | 2014-231453 | 12/2014 |
| JP | 2015-218085 | 12/2015 |
| WO | 2012/073998 | 6/2012 |
| WO | 2014/065241 | 5/2014 |

OTHER PUBLICATIONS

Yuxi Xu et al., "Holey graphene frameworks for highly efficient capacitive energy storage", Nature Communications, 2014, 5554.
Huanjing Wang et al., "Creation of nanopores on graphene planes with MgO template for preparing high-performance supercapacitor electrodes", Nanoscale, 2014, 6, 6577.
Tae Young Kim et al., "Activated Graphene-Based Carbons as Supercapacitor Electrodes with Marco- and Mesopores", ACSNANO, 2013, 7, 6899.
Yanwu Zhu et al., "Carbon-Based Supercapacitors Produced by Activation of Graphene", Science, 2011, 332, 1537.
Stanislav M. Avdoshenko et al., "Dynamic and Electronic Transport Properties of DNA Translocation through Graphene Nanopores", Nano Letters, 2013, 13, 1969.
Notice of Reasons for Refusal dated Oct. 29, 2019, issued in Japanese Patent Application No. 2018-506756, with English-language translation.
Extended European Search Report dated Oct. 22, 2019 in European Patent Application No. 16895487.3.

* cited by examiner

Fig. 16
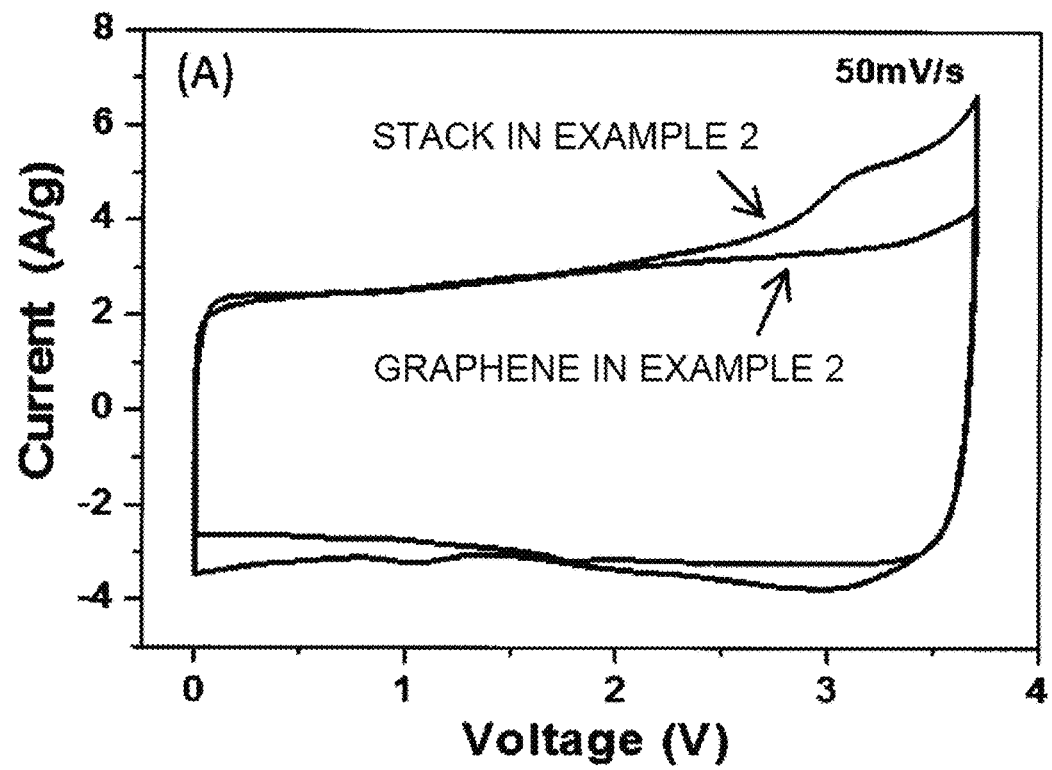
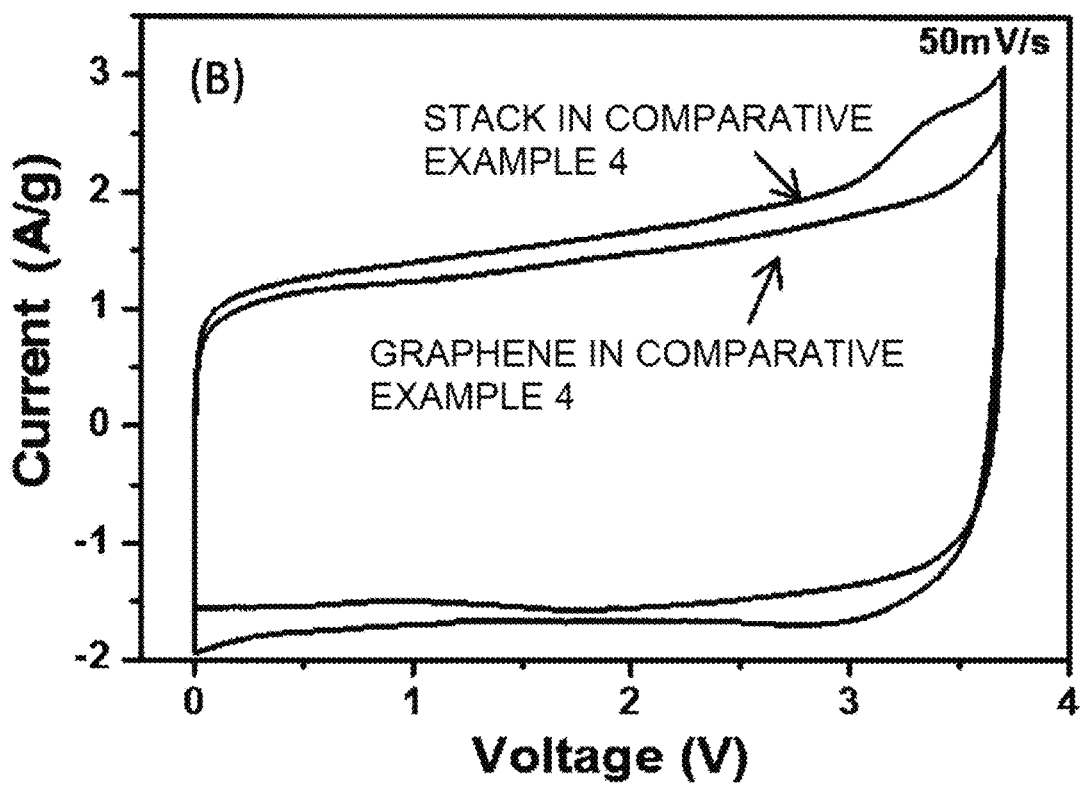

METHOD FOR MANUFACTURING STACK OF GRAPHENE AND CARBON NANOTUBE, ELECTRODE MATERIAL INCLUDING STACK OF GRAPHENE AND CARBON NANOTUBE, AND ELECTRIC DOUBLE-LAYER CAPACITOR USING THE SAME

TECHNICAL FIELD

The present invention relates to a method for manufacturing a stack of graphene and carbon nanotube, an electrode material including a stack of graphene and carbon nanotube, and an electric double-layer capacitor using the same.

BACKGROUND ART

Power storage devices typified by an electric double-layer capacitor and a lithium ion battery have attracted attention for their large capacitance. The performance of such power storage devices largely depends on an electrode material, and electrode materials that can increase the electrostatic capacitance, the energy density, and the power density have been developed.

It has been known that graphene is used as an electrode material of an electric double-layer capacitor. For example, a sheet-shaped electrode including a porous graphene layer through which electrolyte solution ions can pass has been developed (see, for example, Non-Patent Literature 1). According to Non-Patent Literature 1, graphene is integrated into layers to achieve an energy density of 35 Wh/kg. Another example is a porous graphene sheet in which graphene is grown by CVD using MgO as a template (see, for example, Non-Patent Literature 2). According to Non-Patent Literature 2, the electrolyte solution ions move easily to a vertical direction of the graphene sheet to achieve an electrostatic capacitance of 303 F/g.

Still another known example is a graphene sheet film having carbon nanotube held between graphene sheets (see, for example, Patent Literature 1). According to Patent Literature 1, by using the conductivity of carbon nanotube in addition to the characteristics of the graphene sheet, an electrostatic capacitance of 290.6 F/g and an energy density of 62.8 Wh/kg are achieved.

An electrode material including graphene with nanopores has also been developed (for example, see Non-Patent Literatures 3 and 4, and Patent Literature 2). According to Non-Patent Literature 3, an electrode material in which nanopores are introduced to graphene by KOH using microwaves achieves an energy density of 100 Wh/kg. According to Non-Patent Literature 4, graphene oxide is separated by microwaves, activation is performed using KOH, and then, heating is performed, so that nanopores are introduced to graphene. Such graphene includes nanopores each having a size of 0.6 nm to 5 nm, and has a specific surface area of 3100 $m^2$/g. According to Patent Literature 2, nanopores are introduced to graphene by a continuous electrolytic peeling method. In addition, Patent Literature 2 discloses that the electrode material includes a stack of carbon nanotube and graphene having nanopores introduced by a continuous electrolytic peeling method. Such an electrode material achieves an energy density of 90.3 Wh/kg.

On the other hand, it has been known that graphene is used for other purposes than the electrode material (for example, see Patent Literature 3 and Non-Patent Literature 5). Patent Literature 3 discloses that macromolecules are analyzed using a nanopore device based on graphene. Non-Patent Literature 5 discloses a sensor in which nanopores are introduced to a graphene stack and DNA is caused to pass the nanopores by an electric field.

As described above, it has been examined to utilize the characteristics of graphene by various perspectives and attempts of means for those perspectives. However, the examinations for the utilization of graphene are still in the unexplored territory, and it has been strongly expected to develop an electrode material including graphene that further improves capacitor characteristics such as the electrostatic capacitance, the energy density, and the power density. It would be preferable if other applications of such an electrode material were developed.

CITATION LIST

Patent Literatures

Patent Literature 1: International Publication No. WO 2012/073998
Patent Literature 2: International Publication No. WO 2014/065241
Patent Literature 3: U.S. Patent Application Publication No. 2013/0309776

Non-Patent Literatures

Non-Patent Literature 1: Y. Xu, et al., Nature Communication, 2014, 5554
Non-Patent Literature 2: H. Wang, et al., Nanoscale, 2014, 6, 6577
Non-Patent Literature 3: T-Y. Kim, et al., ACSNANO, 2013, 7, 6899
Non-Patent Literature 4: Y. Zhu, et al., Science, 2011, 332, 1537
Non-Patent Literature 5: S. M. Avdoshrnko, et al., Nano Letters, 2013, 13, 1969

SUMMARY OF INVENTION

Technical Problem

An object of the present invention is to provide a novel method for manufacturing a graphene stack that can further improve a capacitor characteristic using graphene, an electrode material including the graphene stack, and an electric double-layer capacitor including the graphene stack.

Solution to Problem

The present invention provides a novel method for manufacturing a stack of graphene and carbon nanotube. That is to say, the manufacturing method according to the present invention includes a step of dispersing the graphene in an aqueous MOH solution (M represents an element selected from a group consisting of Li, Na, and K) to adsorb MOH on the graphene, a step of heating the graphene with MOH adsorbed thereon that is obtained in the adsorption step in vacuum or in an inert atmosphere in a temperature range of 400° C. or more and 900° C. or less to form pores in the graphene, and a step of dispersing the carbon nanotube and the graphene with the pores that are obtained in the step of forming the pores in a dispersion medium to stack the carbon nanotube and the graphene with the pores.

In the step of forming the pores, the graphene with MOH adsorbed thereon may be heated in a temperature range of 650° C. or more and 800° C. or less for 10 minutes or more and 3 hours or less.

In the step of forming the pores, the graphene with MOH adsorbed thereon may be heated in a temperature range of 650° C. or more and 750° C. or less.

In the step of forming the pores, the graphene with MOH adsorbed thereon may be heated in a temperature range of 675° C. or more and 725° C. or less.

The method may further include prior to the adsorption step: a step of freeze-drying an oxidized graphene dispersion liquid in which oxidized graphene is dispersed in water; and a step of thermally reducing the oxidized graphene dispersion liquid that is freeze-dried in a temperature range of 300° C. or more and 700° C. or less for 1 second or more and 10 minutes or less to prepare graphene including a graphene sheet of one or more and three or less layers.

In the adsorption step, the aqueous MOH solution may have a molarity of 5 M or more and 10 M or less.

In the adsorption step, the graphene may be dispersed so that the graphene in the aqueous MOH solution has a concentration of 5 g/L or more and 20 g/L or less.

In the adsorption step, the aqueous MOH solution with the graphene dispersed therein may be stirred at room temperature for 12 hours or more and 30 hours or less.

In the stacking step, the graphene and the carbon nanotube may be dispersed so that a mass ratio of the graphene to the carbon nanotube (graphene/carbon nanotube) is in a range of 1 or more and 50 or less.

In the stacking step, the graphene and the carbon nanotube may be dispersed so that the mass ratio of the graphene to the carbon nanotube (graphene/carbon nanotube) is in a range of 5 or more and 15 or less.

In the stacking step, the dispersion medium may be selected from the group consisting of water, N-methylpyrrolidone (NMP), N,N-dimethylformamide (DMF), and dimethyl sulfoxide (DMSO).

In an electrode material including a stack of graphene and carbon nanotube according to the present invention, the graphene includes pores through which electrolyte solution ions pass; and layers of the graphene are stacked with the carbon nanotube interposed therebetween at intervals that enable the electrolyte solution ions to pass. Thus, the above problem is solved.

The graphene may include a graphene sheet of one or more and three or less layers, and include pores with a pore diameter of 0.4 nm or more and 10 nm or less.

The stack may have a specific capacity in a range of 200 F/g or more and 400 F/g or less.

The graphene may include a carboxylic group and/or a hydroxyl group.

The stack may be manufactured by any of the above methods.

In an electric double-layer capacitor according to the present invention including an electrode and an electrolyte, the electrode includes the electrode material described above. Thus, the above problem is solved.

The electrolyte may be M'OH (M' is an alkali metal) or an ionic liquid selected from the group consisting of EMI-TFSI, EMI-$BF_4$, and MPPp-TFSI.

The electrolyte may be EMI-TFSI and an application voltage may be 4 V or less.

The electrolyte may be MPPp-TFSI and an application voltage may be 4.5 V or more.

Advantageous Effects of Invention

In the manufacturing method according to the present invention, graphene with MOH (M is an element selected from the group consisting of Li, Na, and K) adsorbed thereon is heated in the temperature range of 400° C. or more and 900° C. or less; thus, MOH reacts with C in graphene to become $M_2CO_3$. The resulting $M_2CO_3$ is burned away by the heating, and thus, graphene with pores through which electrolyte solution ions can pass is obtained. When such graphene and carbon nanotube are dispersed in the dispersion medium, the stack in which the carbon nanotube and the graphene are stacked in a self-organizing manner can be provided. In this graphene, the electrolyte solution ions can pass, and between the layers of graphene, the electrolyte solution ions can pass.

The stack allows the electrolyte solution ions to penetrate not just a surface of graphene but also the inside of the stack through the pores and moreover, the electrolyte solution ions that have penetrated can move between the layers of graphene easily. Thus, graphene and the electrolyte solution ions can exchange electrons also inside the stack. As a result, the electrostatic capacitance can be increased drastically and the energy density and the power density can be improved. Thus, when a capacitor is formed using an electrode material including the stack according to the present invention, an electric double-layer capacitor with high capacitor performance having the energy density and the power density increased can be provided.

BRIEF DESCRIPTION OF DRAWINGS

FIG. 16 is a diagram showing the specific capacity-voltage curves (CV curves) when the stack in Example 2 and Comparative example 4 is used and EMI-BF$_4$ is used as the electrolyte.

DESCRIPTION OF EMBODIMENTS

Embodiments of the present invention will hereinafter be described with reference to the drawings. Note that the similar components are denoted by the same reference sign and the description of such components is not repeated.

First Embodiment

In a first embodiment, it will be described a stack according to the present invention and a method for manufacturing the stack.

Figure 1:
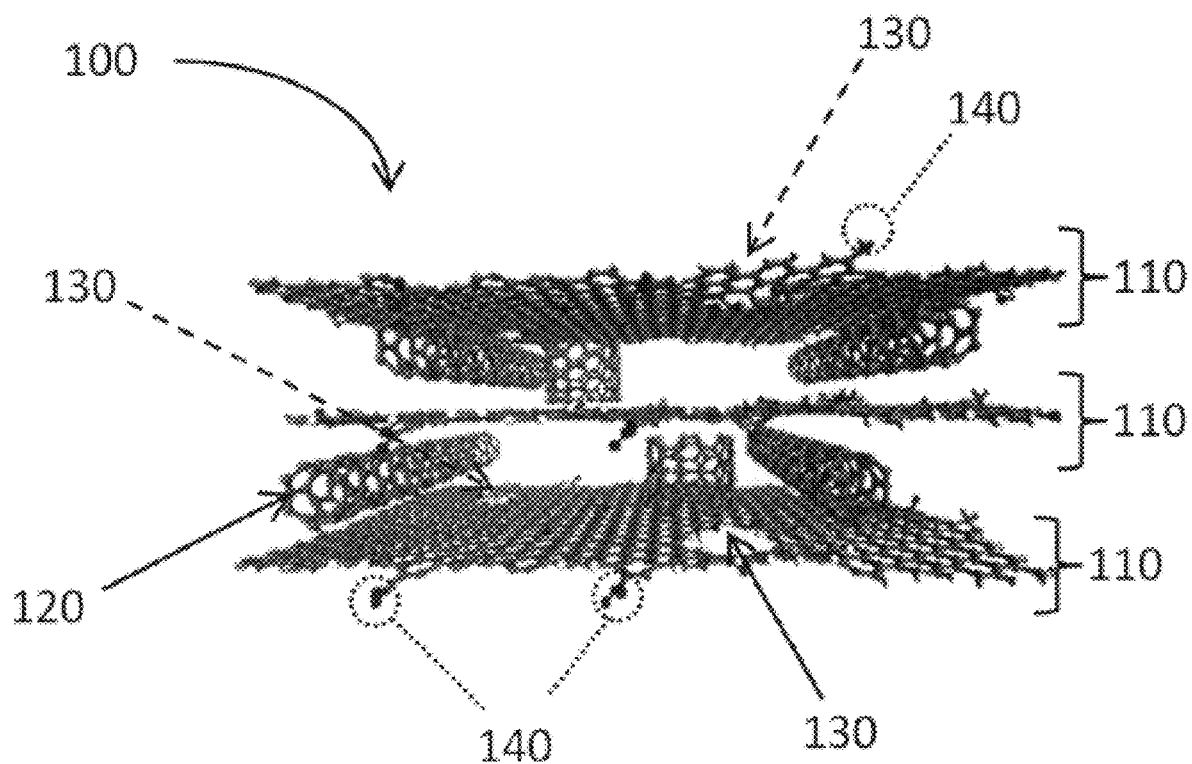
FIG. 1 is a schematic diagram of a stack according to the present invention.

FIG. 1 is a schematic diagram of a stack according to the present invention.

A stack 100 according to the present invention is a stack of graphene 110 and a carbon nanotube 120. The graphene 110 includes pores 130 through which electrolyte solution ions pass. Layers of the graphene 110 are stacked with the carbon nanotube 120 interposed therebetween, and the layers of the graphene 110 are spaced apart from each other so that the electrolyte solution ions can pass. For simplification, FIG. 1 illustrates three layers of the graphene 110; however, the number of layers is not limited to three. The number of layers may be four or more, or the layers may be stacked in a plurality of directions.

The inventors of the present application have discovered that, by such a design using the graphene and the carbon nanotube, the electrode material that can drastically improve the capacitor performance is obtained. When the stack according to the present invention is used in the electrode material of the capacitor, the electrolyte solution ions can penetrate not just a surface of the graphene 110 but also the inside of the stack 100 through the pores 130 (that is, the electrolyte solution ions move in a vertical direction relative to a plane direction of the graphene 110). Furthermore, the electrolyte solution ions that have penetrated can move easily between the layers of the graphene 110 (that is, the electrolyte solution ions move in a horizontal direction that is the same as the plane direction of the graphene 110). Thus, the graphene 110 and the electrolyte solution ions can exchange electrons also inside the stack 100. As a result, the electrostatic capacitance can be drastically increased and the energy density and the power density can be increased.

The graphene 110 preferably includes a graphene sheet of one or more and three or less layers. The graphene 110 serves as walls that form the space between the layers of the graphene 110 and the walls are very thin and flexible. Therefore, by using the flexibility of the graphene 110, the size of the space between the layers of the graphene 110 can be expanded easily on the basis of the application voltage.

The pore 130 has a diameter of, preferably, 0.4 nm or more and 10 nm or less. Thus, the electrolyte solution ions can pass through the pores 130. More preferably, the pore 130 has a diameter of 2 nm or more and 4 nm or less, and in this case, more electrolyte solution ions can pass through the pores 130.

The graphene 110 may have a functional group 140 such as a carboxyl group or a hydroxyl group. Such a functional group 140 remains on a surface of the graphene 110 in the manufacture, and even if the capacitor includes the functional group 140, the capacitor performance can be maintained.

The stack 100 has a specific capacity of 200 F/g or more and 400 F/g or less; therefore, by using such an electrode material for the capacitor, the energy density and the power density can be improved.

The carbon nanotube 120 may be an aggregation of a plurality of carbon nanotubes, or single nanotube; how the carbon nanotube exists is not limited to a particular mode. The carbon nanotube 120 may independently exist or may exist in a bundle shape, an entangled shape, or a mixed state of these shapes. Alternatively, the carbon nanotube 120 may have various numbers of layers or may include various outer diameters.

The carbon nanotube 120 is single-walled carbon nanotube (SWNT), double-walled carbon nanotube (DWNT), or multi-walled nanotube (MWNT), and is preferably single-walled carbon nanotube. The single-walled carbon nanotube has conductivity as high as $10^4$ S/cm or more, and since the stack 100 has the higher conductivity, the capacitor performance can be improved.

The carbon nanotube 120 is controlled so that the distance between the layers of the graphene 110 in the stack 100 corresponds to the electrolyte solution ions. From this perspective, the diameter of the carbon nanotube 120 is preferably 0.4 nm or more and 10 nm or less. Since the graphene 110 is highly flexible as described above, the distance between the layers can be controlled on the basis of the application voltage so that the electrolyte solution ions can pass. More preferably, the diameter of the carbon nanotube 120 is 1 nm or more and 3 nm or less.

In the stack 100, the mass ratio of the graphene to the carbon nanotube is in the range of 1 or more and 50 or less. If the mass ratio is less than 1, the graphene is not contained enough to achieve the function as the electrode material. If the mass ratio is more than 50, the carbon nanotube does not function as a spacer. Preferably, the mass ratio is in the range of 5 or more and 15 or less. Within this range, the stack 100 can have the specific surface area and the specific capacity that are described above.

In the present specification, the carbon nanotube 120 is used between the layers of the graphene 110; however, other fibrous materials than the carbon nanotube 120 may be used for the perspective of the spacer.

The average of the outer diameters of the fibrous materials is not limited to a particular value; however, it is preferable that the average of the outer diameters is in the range of 0.4 to 5.0 nm, more preferably 1.0 to 3.0 nm, from the viewpoint of efficiently forming a composition with a two-dimensional material. The average of the outer diameters of the fibrous materials can be calculated in the following manner: the fibrous materials are observed with a transmission type electronic microscope at an arbitrary magnification, a plurality of parts of the fibrous materials is extracted arbitrarily from a viewing field whose certain proportion in a viewing field area is the fibrous materials, and an arithmetic average value is obtained from the outer diameters of the extracted parts of the fibrous materials.

In the stack 100, it is preferable that the carbon nanotube 120 is not aggregated in a bundle shape but dispersed between the layers of the graphene 110. Thus, the electrolyte solution ions can easily move between the layers of the graphene 110. Such a dispersed state of the carbon nanotube 120 is achieved by a manufacturing method according to the present invention that will be described below.

Figure 2:
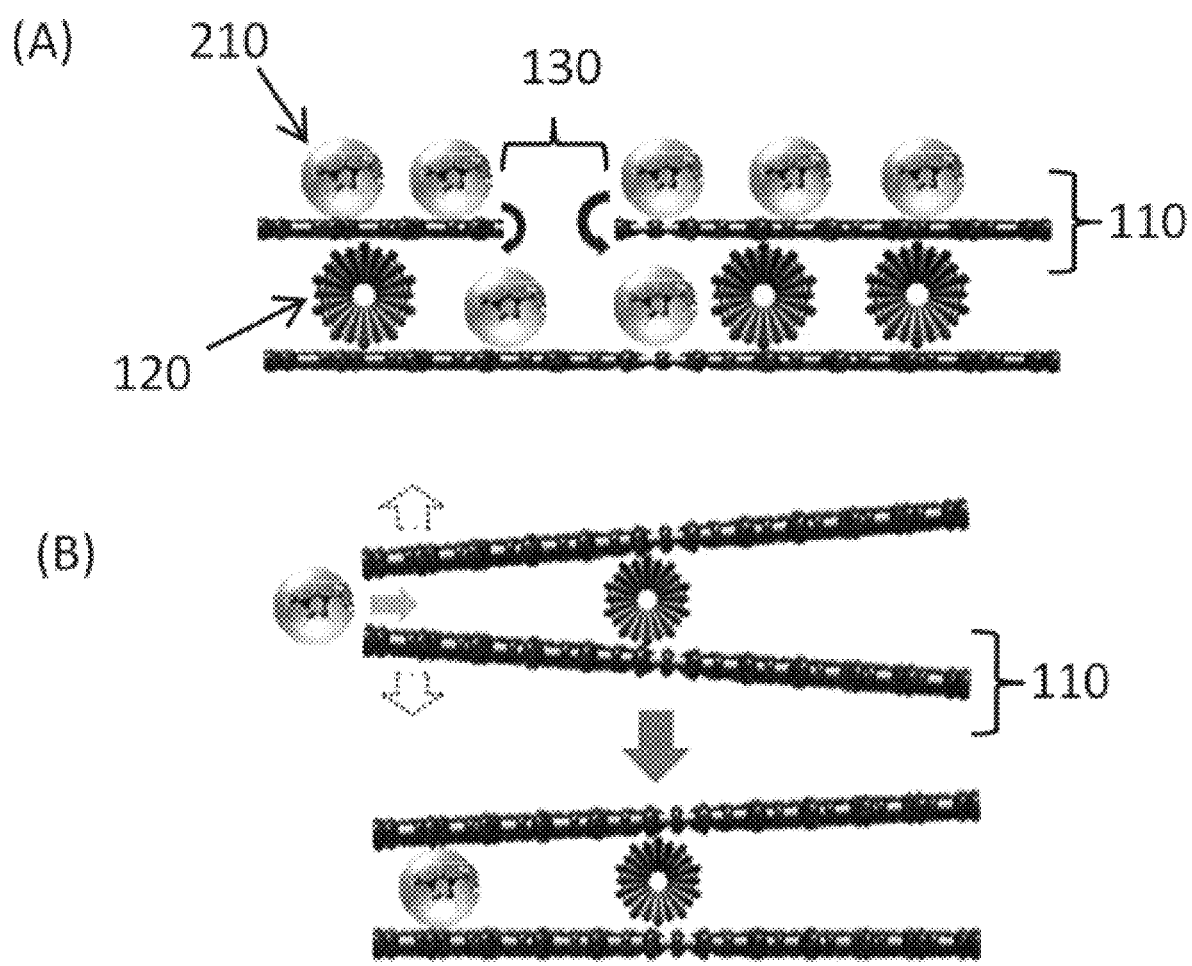
FIG. 2 is a schematic diagram for describing the improvement of the energy density and the power density by a stack 100 according to the present invention.

FIG. 2 is a schematic diagram for describing the improvement of the energy density and the power density by the stack 100 according to the present invention.

As described with reference to FIG. 1, the stack 100 according to the present invention includes the pores 130 through which the electrolyte solution ions in the graphene 110 pass, and the space that is formed between the layers of the graphene 110 with the carbon nanotube 120 interposed therebetween and that allows the electrolyte solution ions to pass.

The pores 130 are formed in the graphene 110 including a graphene sheet of one or more and three or less layers. The size of the pore 130 is controlled by adjusting a heating condition to be described below. On the other hand, since the space is formed between the graphene 110 including the graphene sheet of one or more and three or less layers, the walls that form the space are thin and flexible. The size of the space can have a relatively wide distribution ranging from the space between the layers of the graphene 110 to the carbon nanotube 120.

As illustrated in FIG. 2(A), electrolyte solution ions 210 can penetrate the stack 100 from the pores 130 of the graphene 110 on the surface of the stack 100, and diffuse into the stack 100. The electrolyte solution ions 210 that have penetrated and diffused are desirably diffused further into the stack 100. However, if the distance between the layers of the graphene 110 is small inside the stack 100 as illustrated in an upper part in FIG. 2(B), the electrolyte solution ions 210 may be unable to diffuse any further. As described above, however, by using the flexibility of the graphene 110, the space formed between the layers of the graphene 110 can be expanded easily on the basis of the application voltage when the material is actually employed as the electrode material of the capacitor (see lower part of FIG. 2(B)). As a result, when the stack 100 according to the present invention is used as the electrode material, the electrolyte solution ions remarkably penetrate and diffuse into the stack 100 and the energy density and the power density are drastically improved.

The stack 100 according to the present invention having the structure as described above is manufactured by a manufacturing method according to the present invention, which is to be described next. The method for manufacturing the stack 100 according to the present invention will be described with reference to FIG. 3.

Figure 3:
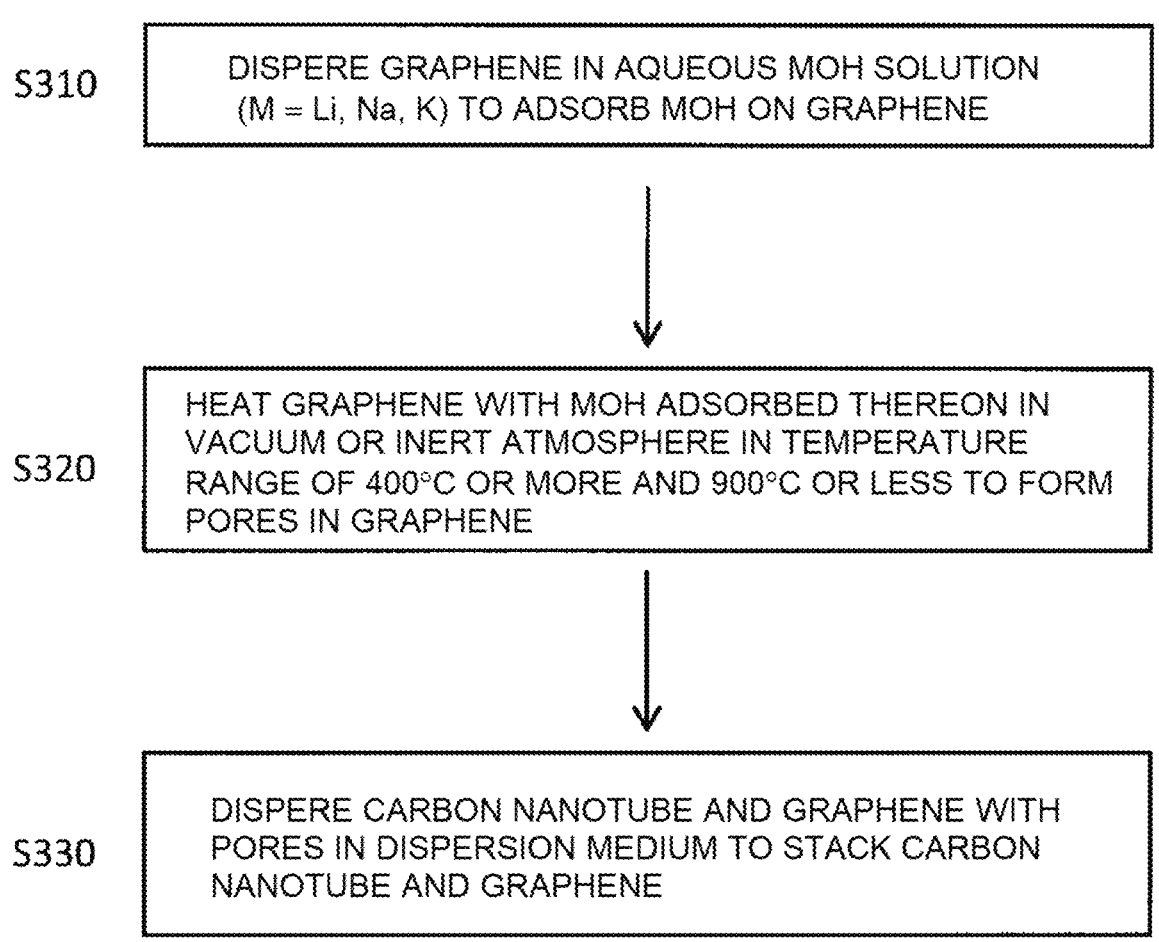
FIG. 3 is a flowchart of a manufacturing process for the stack according to the present invention.

FIG. 3 is a flowchart of a manufacturing process for the stack according to the present invention.

Step S310: graphene is dispersed in an aqueous MOH solution (M is an element selected from the group consisting of Li, Na, and K) and MOH is adsorbed on graphene. The molarity of the aqueous MOH solution is preferably in the range of 0.1 M or more and 10 M or less. If the molarity is less than 0.1 M, MOH is not sufficiently adsorbed on graphene; therefore, the formation of the pores may fail. If the molarity is more than 10 M, MOH is excessively adsorbed on graphene and it may be difficult to control the pore diameter. The molarity of the aqueous MOH solution is preferably in the range of 5 M or more and 10 M or less. Thus, graphene can adsorb MOH more certainly. The aqueous MOH solution is preferably an aqueous KOH solution. KOH is easily adsorbed on graphene.

The graphene is dispersed so that the graphene concentration in the aqueous MOH solution is 1 g/L or more and 50 g/L or less. If the graphene concentration in the aqueous solution is less than 1 g/L, graphene is deficient; therefore, MOH is adsorbed excessively on graphene and it may be difficult to control the pore diameter. If the graphene concentration in the aqueous solution is more than 50 g/L, graphene is excessive; therefore, MOH is not sufficiently adsorbed on graphene and the formation of the pores may fail. It is more preferable that graphene is dispersed so that the graphene concentration in the aqueous MOH solution is 5 g/L or more and 20 g/L or less. Thus, MOH is adsorbed on graphene and graphene with the above pore diameter can be obtained. It is much more preferable that the graphene is dispersed so that the graphene concentration in the aqueous MOH solution is 15 g/L or less. Thus, it is possible to control so that MOH is adsorbed to graphene certainly and the graphene with the pore diameter in the above range can be obtained.

In a specific procedure of the adsorption, the aqueous MOH solution with the graphene dispersed therein may be held at room temperature for 12 hours or more and 30 hours or less. If the solution is held for less than 12 hours, the adsorption occurs but may be insufficient. If the solution is held over 30 hours, the amount of adsorption remains the same. After the solution is held, the aqueous MOH solution with the graphene dispersed therein is filtered. In the present specification, the room temperature refers to the temperatures in the range of 15° C. or more and 30° C. or less.

Step S320: the graphene with MOH adsorbed thereon obtained in step S310 is heated in vacuum or an inert atmosphere in the temperature range of 400° C. or more and 900° C. or less. Between MOH and the carbon of graphene, the following reaction occurs and finally, pores are formed in the graphene with high density. The inert atmosphere may be nitrogen, or rare gas such as argon.

First, MOH adsorbed on graphene and the carbon of graphene react with each other to generate a carbonate of M (Formula (1)):

$$6MOH + 2C \rightarrow 2M + 3H_2 + 2M_2CO_3 \quad (1)$$

Next, as heat is applied, the carbonate of M and the carbon of graphene react further as expressed by the following Formula (2), and through the decomposition and burning, the pores 130 (FIG. 1) are formed:

$$M_2CO_3 + 2C \rightarrow 2K + 3CO \quad (2)$$

Alternatively, as heat is applied, the carbonate of M is decomposed and burned as expressed by Formulae (3) and (4) and thus, the pores 130 are formed:

$$M_2CO_3 \rightarrow K_2O + CO_2 \quad (3)$$

$$CO_2 + C \rightarrow 2CO \quad (4)$$

When the heating temperature is less than 400° C., the reaction does not progress sufficiently and the pores are not formed. When the heating temperature is more than 900° C., it may be difficult to control the pore diameter. Preferably, the heating temperature is 650° C. or more and 800° C. or less, and the heating time is 10 minutes or more and 3 hours or less. Thus, the graphene including the pores with a pore diameter of 0.4 nm or more and 10 nm or less and having a specific surface area (BET method) of 700 m²/g or more and 4000 m²/g or less can be obtained. More preferably, the heating temperature is 650° C. or more and 750° C. or less. Thus, the graphene including the pores with a pore diameter of 0.4 nm or more and 10 nm or less and having a specific surface area of 700 m²/g or more and 4000 m²/g or less can be obtained for sure. More preferably, the heating temperature is 675° C. or more and 725° C. or less. Thus, the graphene including the pores with a pore diameter of 0.4 nm or more and 10 nm or less and having a specific surface area as large as 2000 m²/g or more and 4000 m²/g or less can be obtained.

Step S330: the carbon nanotube and the graphene with the pores obtained in step S320 are dispersed in a dispersion medium and the carbon nanotube and the graphene with the pores are stacked.

The dispersion medium is preferably selected from the group consisting of water, N-methylpyrrolidone (NMP), N,N-dimethylformamide (DMF), and dimethyl sulfoxide (DMSO). NMP, DMF, and DMSO can disperse the graphene and the carbon nanotube well. Water can also disperse the graphene and the carbon nanotube, and in the case of using water, a surfactant is preferably used together. Examples of the surfactant include dodecylbenzene sodium sulfonate, dodecyl sodium sulfate, sodium cholate, and sodium deoxycholate.

The carbon nanotube is single-walled carbon nanotube (SWNT), double-walled carbon nanotube (DWNT), or multi-walled nanotube (MWNT), and is preferably single-walled carbon nanotube. The single-walled carbon nanotube has conductivity as high as $10^4$ S/cm or more, and can provide a stack with the higher conductivity.

In step S330, it is preferable to disperse in the dispersion medium the carbon nanotube and the graphene with the pores so that the mass ratio of the graphene to the carbon nanotube (graphene/carbon nanotube) is in the range of 1 or more and 50 or less. If the mass ratio is less than 1, the graphene is not contained enough to achieve the function as the electrode material. If the mass ratio is more than 50, the carbon nanotube does not function as the spacer and the formation of the stack may fail. Preferably, the mass ratio is in the range of 5 or more and 15 or less. Within this range, the graphene and the carbon nanotube are stacked in the excellent manner.

In a specific procedure of stacking the layers, for example, the graphene with the pores may be dispersed in the dispersion medium and the carbon nanotube may be added thereto, and the mixture may be stirred at room temperature. Thus, the stack including the carbon nanotube between the layers of the graphene can be obtained in a self-organizing manner.

Note that the graphene used in step S310 is preferably graphene manufactured by a thermal reduction method. The graphene manufactured by the thermal reduction method is formed of a graphene sheet including one or more and three or less layers and is excellent in dispersibility. In addition, since the graphene manufactured by the thermal reduction method includes functional groups such as a carboxyl group and a hydroxyl group abundantly in its manufacturing process, using the graphene with such functional groups as a starting material can promote the adsorption of MOH on the graphene in step S310 and thus, the pores can be formed with high density.

The thermal reduction method that is performed prior to step S310 is described with reference to FIG. 4.

Figure 4:
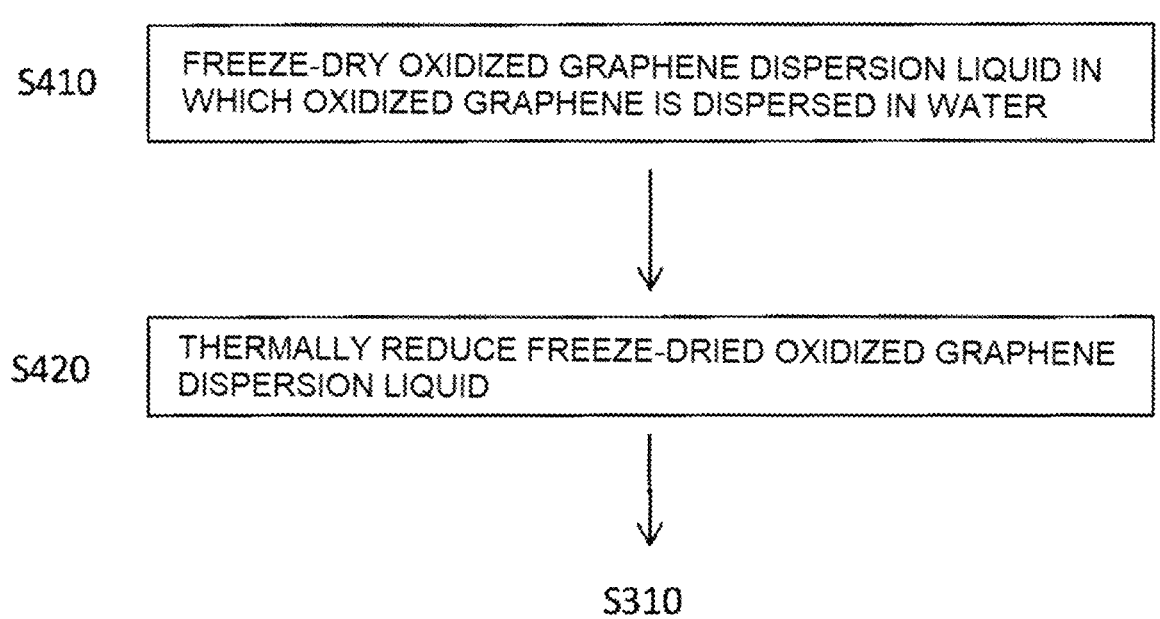
FIG. 4 is a flowchart of a manufacturing process for graphene by a thermal reduction method.

FIG. 4 is a flowchart of a manufacturing process for the graphene by the thermal reduction method.

Step S410: oxidized graphene is dispersed in water to form an oxidized graphene dispersion liquid, and the oxidized graphene dispersion liquid is freeze-dried. Thus, oxidized graphene in a foamed state is obtained. Oxidized graphene may be commercial oxidized graphene, or may be manufactured from graphite particles by, for example, Brodie method, Staudenmaier method, Hummer method, or improved Hummers method. To a surface of oxidized graphene, functional groups such as a carbonyl group, a carboxyl group, and a hydroxyl group are added. Oxidized graphene is also referred to as graphene oxide (GO).

Oxidized graphene is dispersed in water so that the concentration of oxidized graphene in the dispersion liquid becomes 0.5 mg/mL or more and 50 mg/mL or less. More preferably, the oxidized graphene is dispersed in water so that the concentration becomes 1 mg/mL or more and 5 mg/mL or less. This dispersion promotes freeze-drying, and thus, oxidized graphene in a foamed state having a density of 1 g/L or more and 50 g/L or less can be obtained.

In a specific procedure of the freeze-drying, the oxidized graphene dispersion liquid with the concentration controlled as above may be kept in a dry-freezer maintained at −5° C. or less for 5 hours or more and 100 hours or less, or immersed in liquid nitrogen for 1 minute or more and 10 minutes or less.

Step S420: the oxidized graphene dispersion liquid that is freeze-dried in step S410 is thermally reduced in the temperature range of 300° C. or more and 700° C. or less for 1 second or more and 10 minutes or less. Thus, the carbonyl group added to the oxidized graphene dispersion liquid that is freeze-dried is removed and the oxidized graphene is reduced to graphene. The reduced graphene includes a graphene sheet of one or more and three or less layers. Since the functional groups such as the carboxyl group and the hydroxyl group added in step S410 remain, the graphene keeps the hydrophilicity and the adsorption of MOH can be promoted in step S310 as described above. The atmosphere of the thermal reduction may be air, or an inert atmosphere of argon, nitrogen, or the like.

Second Embodiment

In a second embodiment, it will be described the application of the electrode material including the stack according to the present invention that is obtained in the first embodiment.

Figure 5:
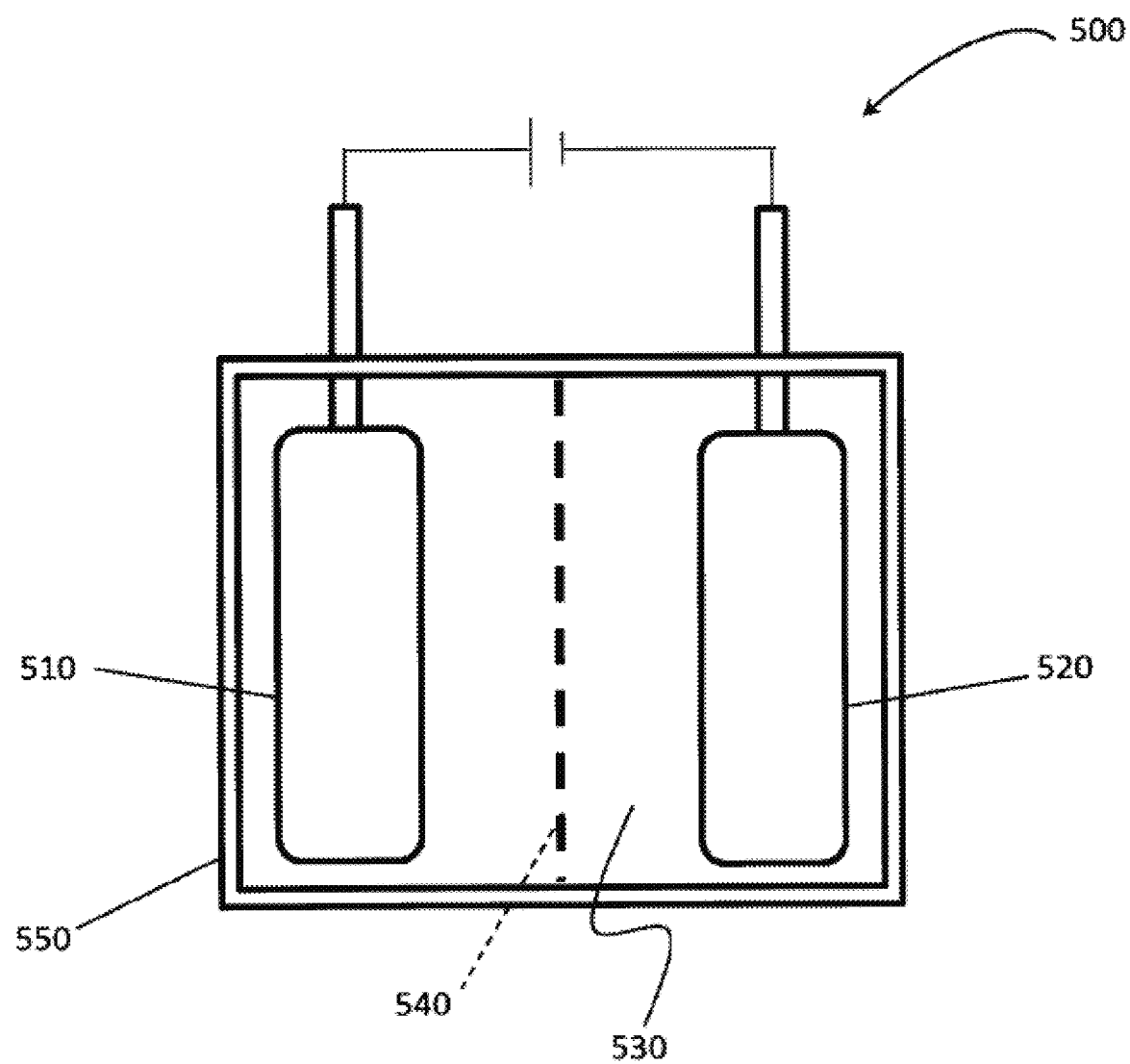
FIG. 5 is a schematic diagram of an electric double-layer capacitor including an electrode material including the stack according to the present invention.

FIG. 5 is a schematic diagram of an electric double-layer capacitor including the electrode material including the stack according to the present invention.

The electric double-layer capacitor according to the present invention includes at least an electrode and an electrolyte. An electric double-layer capacitor 500 illustrated in FIG. 5 includes a positive electrode 510 and a negative electrode 520 as electrodes. The positive electrode 510 and the negative electrode 520 are immersed in an electrolyte 530. These positive electrode 510 and negative electrode 520 include the electrode material of the stack 100 described in the first embodiment. The electrolyte 530 is M'OH (M' is an alkali metal) or an ionic liquid selected from the group consisting of 1-ethyl-3-methylimidazolium bis(trifluoromethanesulfonyl)imide (EMI-TFSI), 1-ethyl-3-methylimidazolium tetrafluoroborate (EMI-BF$_4$), and 1-methyl-1-propylpiperidinium bis(trifluoromethylsulfonyl)imide (MPPp-TFSI).

As described with reference to FIG. 2, the stack according to the present invention can promote the penetration and diffusion of the electrolyte solution ions by the application voltage. From such a perspective, in a case of operating the electric double-layer capacitor 500 at 4 V or less, the specific capacity can be improved and the energy density can be increased if EMI-TFSI is selected as the electrolyte. In a case of operating the electric double-layer capacitor 500 at 4.5 V or more, the specific capacity can be improved and the energy density can be increased if MPPp-TFSI is selected as the electrolyte.

The electric double-layer capacitor 500 further includes a separator 540 between the positive electrode 510 and the negative electrode 520 so as to separate these positive electrode 510 and negative electrode 520 from each other.

Examples of the material of the separator 540 include fluorine polymer, polyether such as polyethylene oxide and polypropylene oxide, polyolefin such as polyethylene and polypropylene, polyacrylonitrile, polyvinylidene chloride, polymethyl methacrylate, polymethyl acrylate, polyvinyl alcohol, polymethacrylonitrile, polyvinyl acetate, polyvinyl pyrrolidone, polyethylene imine, polybutadiene, polystyrene, polyisoprene, polyurethane polymer, a derivative of any one of those above, cellulose, paper, and non-woven fabric.

In the electric double-layer capacitor 500, the positive electrode 510, the negative electrode 520, the electrolyte 530, and the separator 540 described above are housed in a cell 550. Each of the positive electrode 510 and the negative electrode 520 may include the existing current collector.

The electric double-layer capacitor 500 may be a capacitor of a chip type, a coin type, a mold type, a pouch type, a laminate type, a cylindrical type, or a rectangular type, and may be a module in which these are connected.

Next, description is made of the operation of the electric double-layer capacitor 500 in FIG. 5.

When voltage is applied to the electric double-layer capacitor 500, ions (anions) of the electrolyte 530 are adsorbed on the positive electrode 510 and ions (cations) of the electrolyte 530 are adsorbed on the negative electrode 520. As a result, an electric double layer is formed in each of the positive electrode 510 and the negative electrode 520 and charging is performed. Here, since the positive electrode 510 and the negative electrode 520 are formed using the stack described in the first embodiment, the adsorption and diffusion of the cations and anions become easy and the high rate characteristic can be achieved. In addition, since the positive electrode 510 and the negative electrode 520 are formed using the stack described in the first embodiment, many electrolyte solution ions are adsorbed not just on the surface of the stack but also inside the stack, and the electric double layer is formed. As a result, more electrons are exchanged between the graphene and the electrolyte solution ions, and the higher energy density can be achieved.

When the electric double-layer capacitor 500 that is charged is connected to a circuit such as a resistor, the anions and the cations adsorbed respectively on the positive electrode 510 and the negative electrode 520 are desorbed and discharged. Here, the positive electrode 510 and the negative electrode 520 are formed using the stack described in the first embodiment, and therefore the desorption and the diffusion of the electrolyte solution ions become easy and the high rate characteristic and the high power density can be achieved. Furthermore, since the conductivity is excellent, the power density can also be improved as the desorption and the diffusion become easier.

The stack according to the present invention in the electric double-layer capacitor 500 according to the present invention functions as the electrode material with the high energy density (100 Wh/kg or more) and the high power density (500 kW/kg or more) as described above. Therefore, quick charging becomes possible and the high energy density and the high power density can be achieved. Moreover, since the charging and discharging use the formation of the electric double-layer, the charging and discharging can be performed repeatedly. The electric double-layer capacitor 500 according to the present invention can be used for wind power generation, electric vehicles, or the like.

The stack according to the present invention is effective for the use in the electrode material. If a functional biomolecule such as DNA, enzyme, or antibody is held in the pores of graphene through which the electrolyte solution ions pass or in the space between the layers of graphene through which the electrolyte solution ions pass, a sensor using the functional biomolecule as a sensing element can be formed.

Next, the present invention will be described in detail with reference to specific examples; however, the present invention is not limited to these examples.

EXAMPLES

Example 1

In Example 1, by using the graphene manufactured by a thermal reduction method, a stack in which carbon nanotube (CNT) and graphene with pores formed by heating at 650° C. were stacked was manufactured.

Before the graphene was manufactured by the thermal reduction method, oxidized graphene was prepared from natural graphite powder by improved Hummers method. Graphite powder (2 g) and sodium nitrate (1 g) were mixed and sulfate (50 mL) was added to the mixture, and the solution was stirred in an ice bath. Sodium permanganate (12 g) was slowly added to the solution so that the temperature would not exceed 20° C. The mixture of these was subjected to reaction for an hour in a bath with a temperature of 35° C. Thus, the mixture in a paste form was obtained.

To this paste-form mixture, deionized water was slowly added, and the resulting mixture was further stirred for an hour. Next, water was added to this mixture and after 30-minute stirring, hydrogen peroxide was added. Thus, the dark brown mixture became a yellow suspension.

The yellow suspension was subjected to centrifugal separation, and the obtained solid was washed six times with 5 mass % of chloric acid and deionized water to remove metal ions and acid; then, the solid was dried in vacuum. Thus, oxidized graphene was obtained.

An oxidized graphene dispersion liquid (2 mg/mL) in which oxidized graphene was dispersed in water was freeze-dried at −10° C. for 72 hours (step S410 in FIG. 4). Thus, the oxidized graphene dispersion liquid with a dark yellow color in a foamed state with a density of 2 g/L was obtained.

The oxidized graphene dispersion liquid with the dark yellow color in the foamed state is reduced thermally for 1 minute in the air at 400° C. (step S420 in FIG. 4). This thermal reduction made the oxidized graphene dispersion liquid with the dark yellow color into black graphene. The obtained graphene had a density of 0.07 g/L. As a result of observing the obtained graphene with a scanning electron microscope (SEM, JSM-6500 manufactured by JEOL Ltd.) and a transmission electron microscope (TEM, EMM-2100 manufactured by JEOL Ltd.), it has been confirmed that the graphene includes a graphene sheet with one or more and three or less layers.

Next, the obtained graphene (0.4 g) was dispersed in an aqueous KOH solution (7 M), and held for 24 hours at room temperature (step S310 in FIG. 3). Here, the concentration of graphene in the aqueous KOH solution was 10 g/L. Thus, KOH was adsorbed on graphene. After the holding, the aqueous KOH solution with the graphene dispersed therein was filtered.

The graphene after the filtering was heated for 0.5 hours at 650° C. in an Ar atmosphere (step S320 in FIG. 3). Thus, KOH adsorbed on the graphene and the carbon of the graphene reacted with each other to generate potassium carbonate, and additionally, potassium carbonate was burned and decomposed to form pores.

Figure 6:
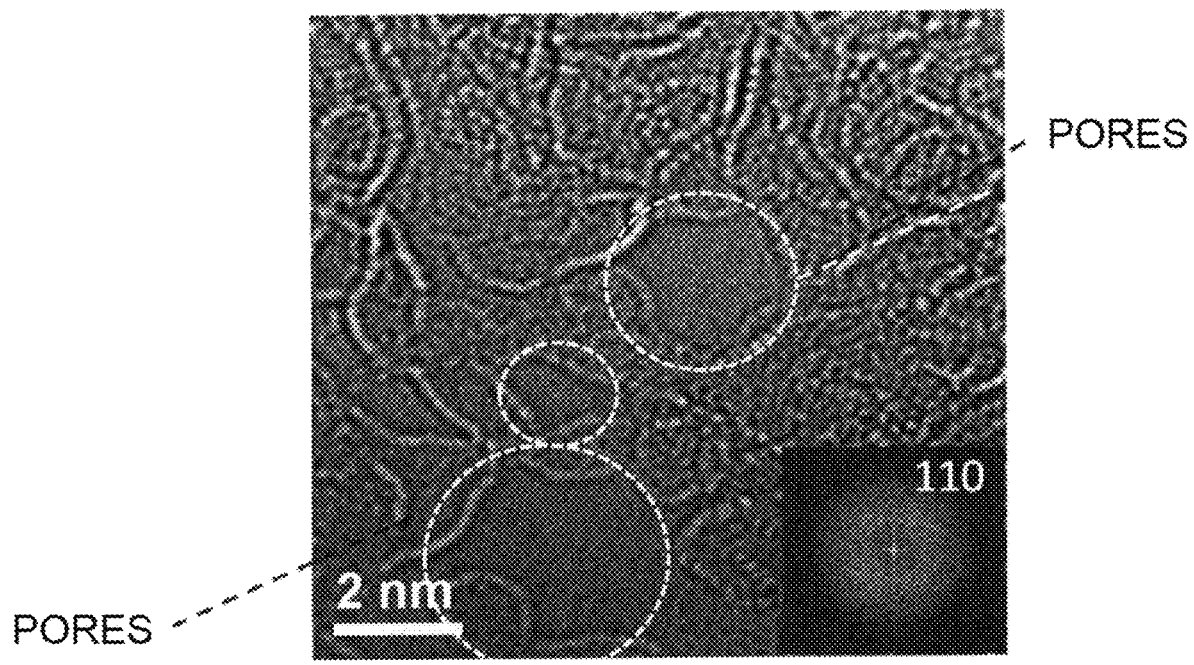
FIG. 6 is an atomic resolution TEM image of the heated graphene in Example 1.
Figure 9:
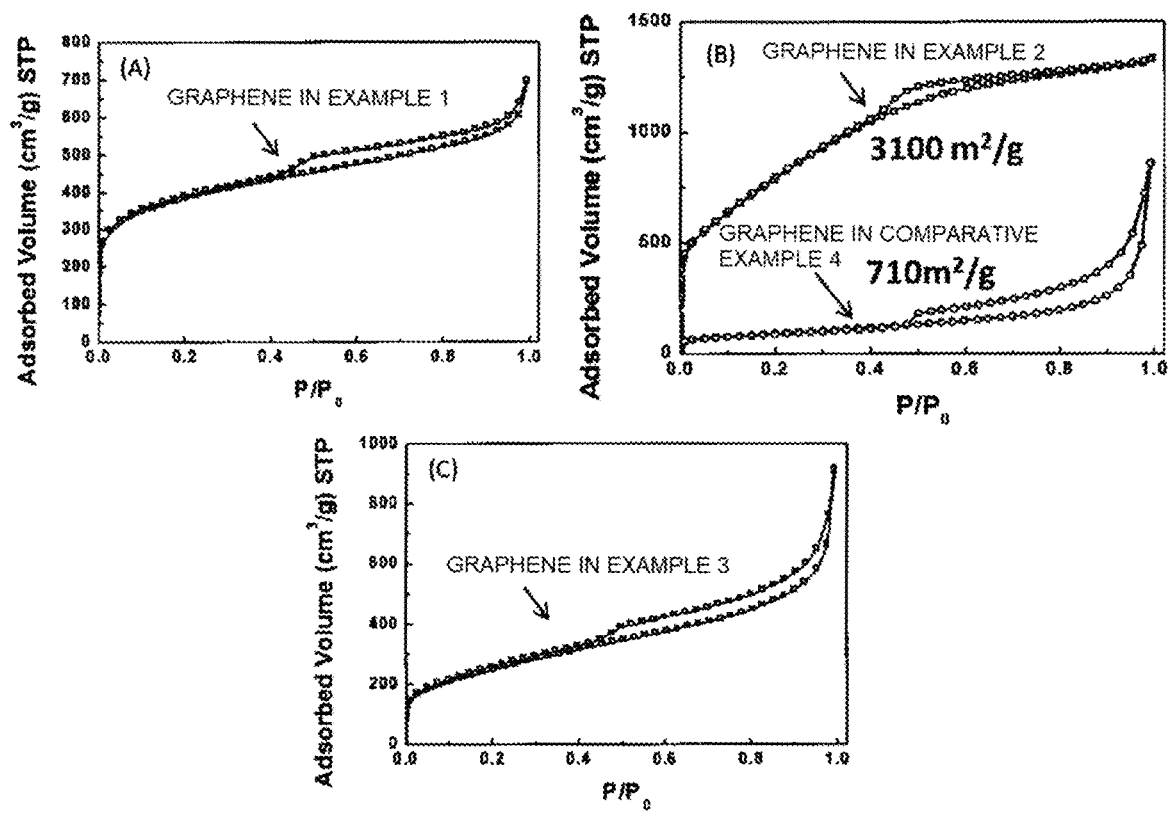
FIG. 9 is a diagram showing nitrogen adsorption-desorption isotherms of the heated graphene in Examples and Comparative example 1 to 4.
Figure 11:
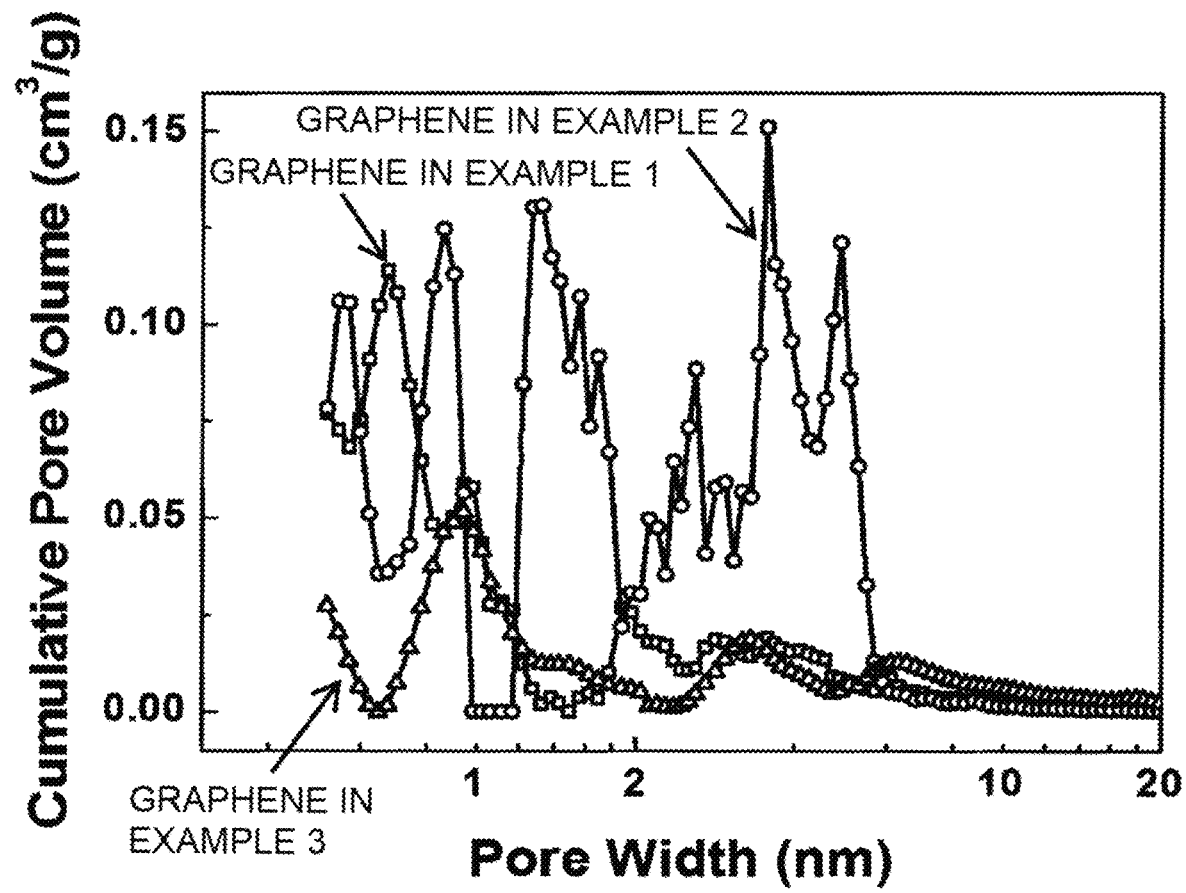
FIG. 11 is a diagram showing pore diameter distributions of the heated graphene in Examples 1 to 3.

Here, the heated graphene was examined in detail. The graphene was observed using the atomic resolution analytical electron microscope (JEM-ARM200F) and evaluated using the Raman microscope based on the Raman spectroscopy (RAMAN-11, Nanophoton). The specific surface area and the pore diameter distribution of the graphene were measured by the BET method. In the measurement, Autosorb-iQ analyzer manufactured by Quantachrome Corporation was used. The specific surface area was calculated based on the amount of adsorption when the relative pressure ($P/P_0$) is in the range of 0.08 to 0.4. These results are shown in FIG. 6, FIG. 9, FIG. 11, and Table 2.

Next, in order to evaluate the electric characteristics of the heated graphene, an electric double-layer capacitor using the heated graphene in an electrode was manufactured. The specific manufacturing procedure was as below. In ethanol, a product (90 wt %) and polytetrafluoroethylene (PTFE, 10 wt %) were dispersed, and the mixture was subjected to an ultrasonic process, so that a suspension was obtained. The suspension was filtered through a porous film by vacuum filtration. This porous film was dried in vacuum for 24 hours, and the film including PTFE and graphene obtained by the vacuum filtration was cut into a circular shape and this circular film was used as the electrode. This electrode had a circular shape with a diameter of 15 mm and a weight of approximately 1 mg. Next, in the cell of stainless steel (550 in FIG. 5), the porous separator (540 in FIG. 5) was disposed between these electrodes (510, 520 in FIG. 5) and the cell was filled with EMI-BF$_4$ and 6 M of KOH as the electrolyte (530 in FIG. 5); thus, the electric double-layer capacitor (500 in FIG. 5) was manufactured. Note that the electric double-layer capacitor was assembled in a glove box filled with an Ar gas.

In the electro-chemical measurement of the electric double-layer capacitor, a multi-channel potentiostat galvanostat (VMP-300, Bio-Logic) was used. The specific capacity-voltage measurement (CV measurement) and the galvanostat charging-discharging measurement were performed at room temperature in the potential range of 0 V to 3.5 V.

The specific capacity Cs (F/g) was calculated in accordance with Cs=4 I/(mdV/dt). Here, I (A) represents constant current, m (g) represents the total mass of the two electrodes, dV/dt (V/s) represents an inclination obtained by performing linear fitting on a discharging curve between Vmax (voltage at a start of discharging) and ½ Vmax. The energy density $E_{cell}$ (Wh/kg) was calculated in accordance with $E_{cell}=CsV^2/8$. The power density $P_{cell}$ (W/kg) was calculated in accordance with $P_{cell}=E_{cell}/t$ (where t represents discharging time). The results are shown in Table 2.

Subsequently, the stack was formed using the graphene with the pores that corresponds to the heated graphene. That is to say, the graphene with the pores was dispersed in N-methylpyrrolidone (NMP, 500 mL) as the dispersion medium and then, single-walled CNT (Cheap Tube Inc., purity of 90% or more) was added and the mixture was stirred for two hours at room temperature (step S330 in FIG. 3). Here, the graphene and the CNT were dispersed so that the mass ratio of the graphene to the CNT became 10.

The single-walled CNT that was used contained 3 wt % of amorphous carbon. The single-walled CNT had a specific surface area of 407 m$^2$/g, conductivity of 10$^4$ S/m, a length of 5 μm or more and 30 μm or less, and a diameter of 4 nm or more and 10 nm or less.

The stirring was performed by an ultrasonic process. It has been confirmed that the graphene and the CNT were uniformly dispersed in the dispersion medium. This dispersion liquid was filtered in vacuum and dried. The obtained stack was examined in detail. A structure of the stack was observed using the SEM and the TEM.

In order to evaluate the electric characteristics of the stack, the electric double-layer capacitor using the stack in the electrode was manufactured. The specific procedure is not described because it is the same as the procedure for the electric double-layer capacitor manufactured to evaluate the electric characteristics of the graphene after step S320.

In regard to the electric double-layer capacitor, the CV measurement and the galvanostat charging-discharging measurement were similarly performed at room temperature in the potential range of 0 V to 3.5 V; thus, the specific capacity, the energy density, and the power density were calculated.

Example 2

In Example 2, a stack in which CNT and graphene manufactured by the thermal reduction method and provided with the pores by heating at 700° C. were stacked was manufactured. Since Example 2 is the same as Example 1 except that the heating temperature in step S320 is set to 700° C., the description is omitted.

In a manner similar to Example 1, the morphology of the graphene after the heating in step S320 and before the stacking in step S330 was observed by an atomic resolution TEM, and thus the Raman spectrum was measured. The nitrogen adsorption-desorption isotherm by the BET method was measured, and the specific surface area and the pore diameter distribution were obtained. The results are shown in FIG. 7 to FIG. 11, and Table 2.

Figure 12:
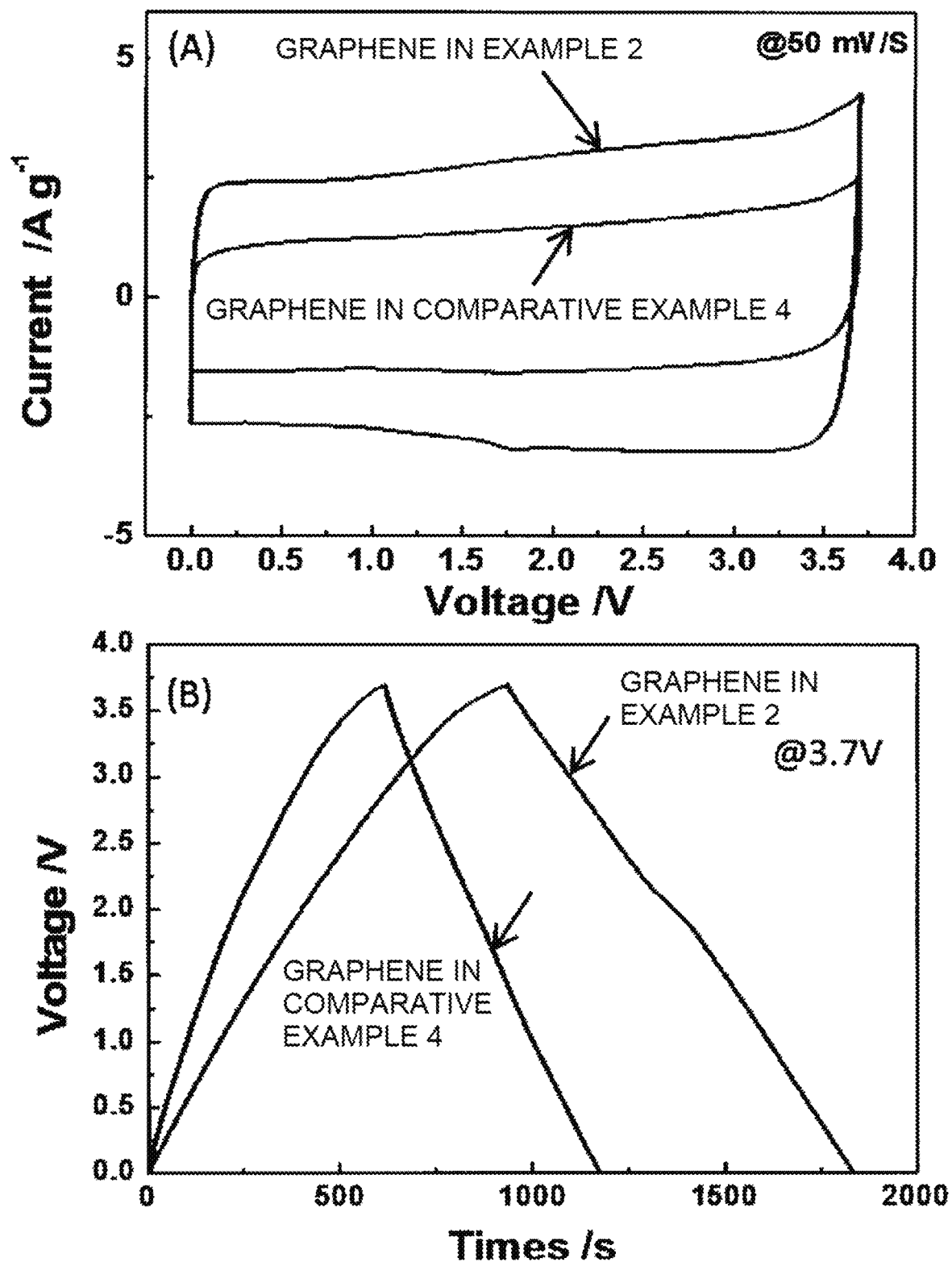
FIG. 12 is a diagram showing specific capacity-voltage curves (CV curves) and charging-discharging curves when the heated graphene in Example 2 and Comparative example 4 is used and EMI-$BF_4$ is used as the electrolyte.
Figure 13:
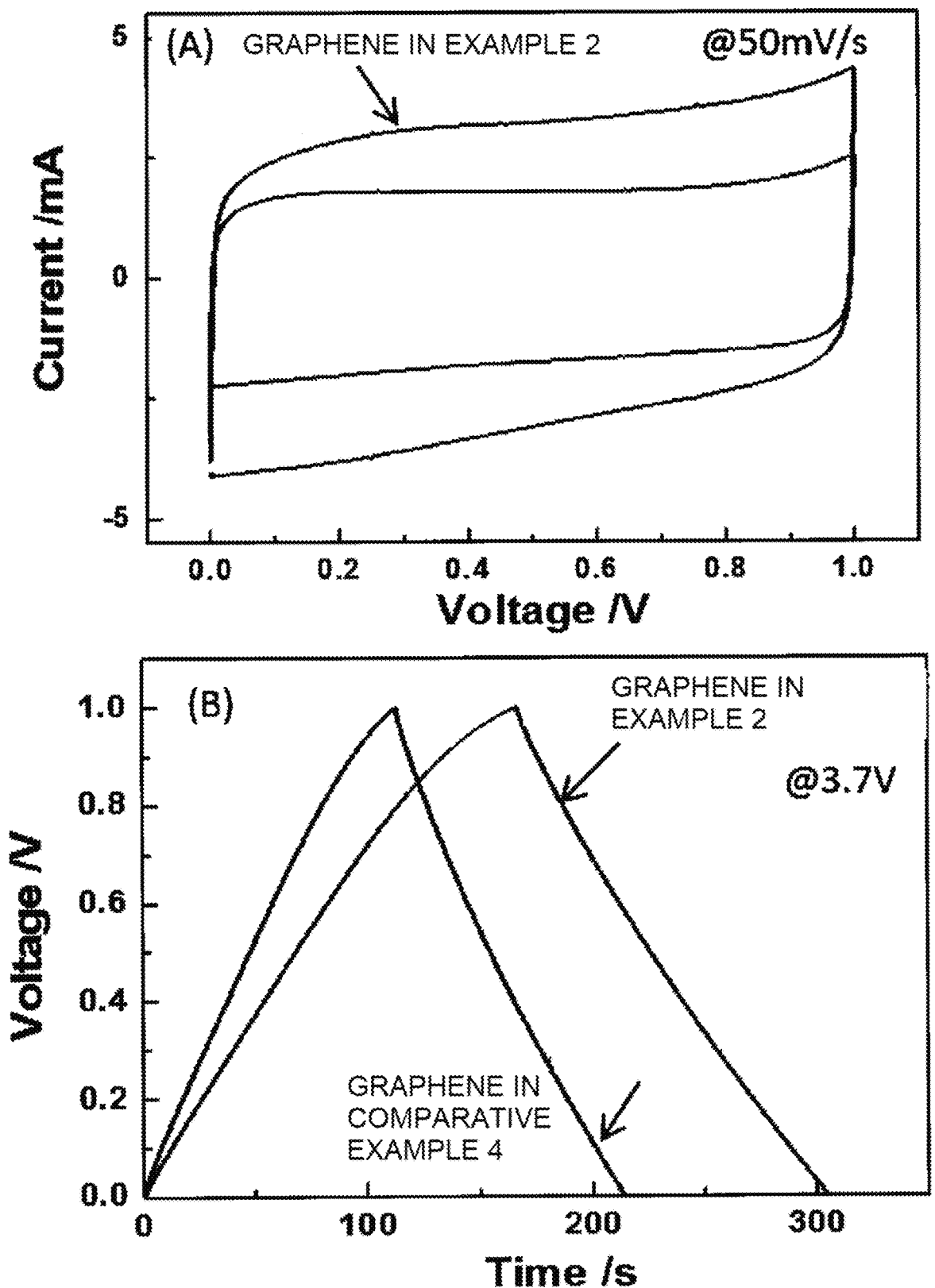
FIG. 13 is a diagram showing the specific capacity-voltage curves (CV curves) and the charging-discharging curves when the heated graphene in Example 2 and Comparative example 4 is used and KOH is used as the electrolyte.

In a manner similar to Example 1, the electric double-layer capacitor in which the graphene after the heating in step S320 and before the stacking in step S330 was used in the electrode was manufactured, and similarly, the CV measurement and the galvanostat charging-discharging measurement were performed at room temperature in the potential range of 0 V to 3.5 V, and thus, the specific capacity, the energy density, and the power density were calculated. These results are shown in FIG. 12, FIG. 13, and Table 2.

Figure 14:
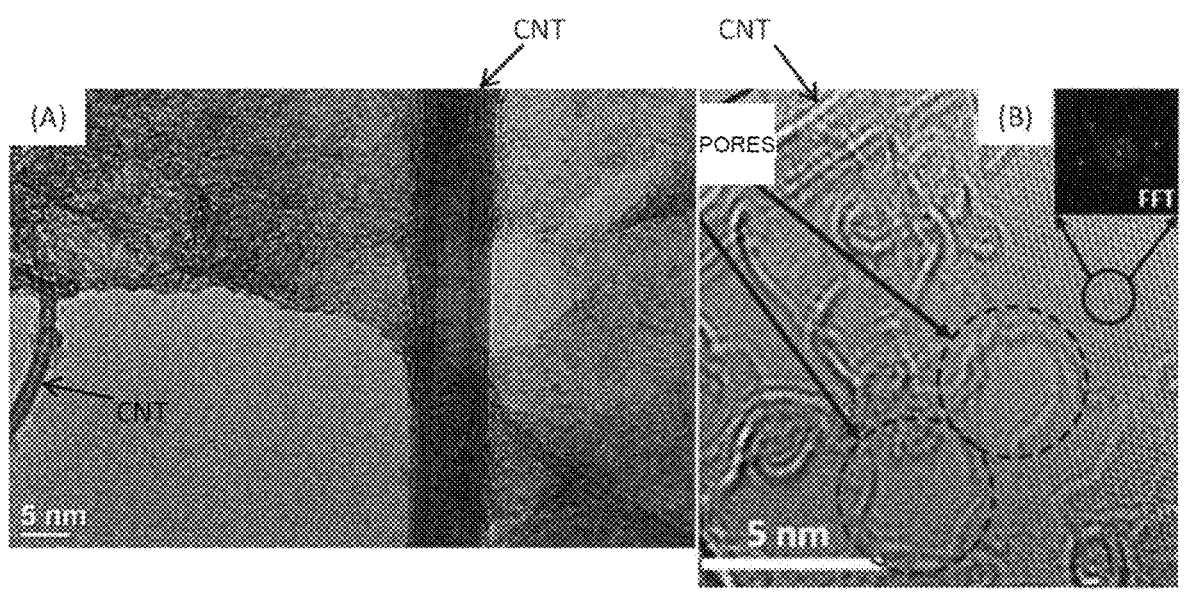
FIG. 14 shows TEM images of a stack according to Example 2.
Figure 15:
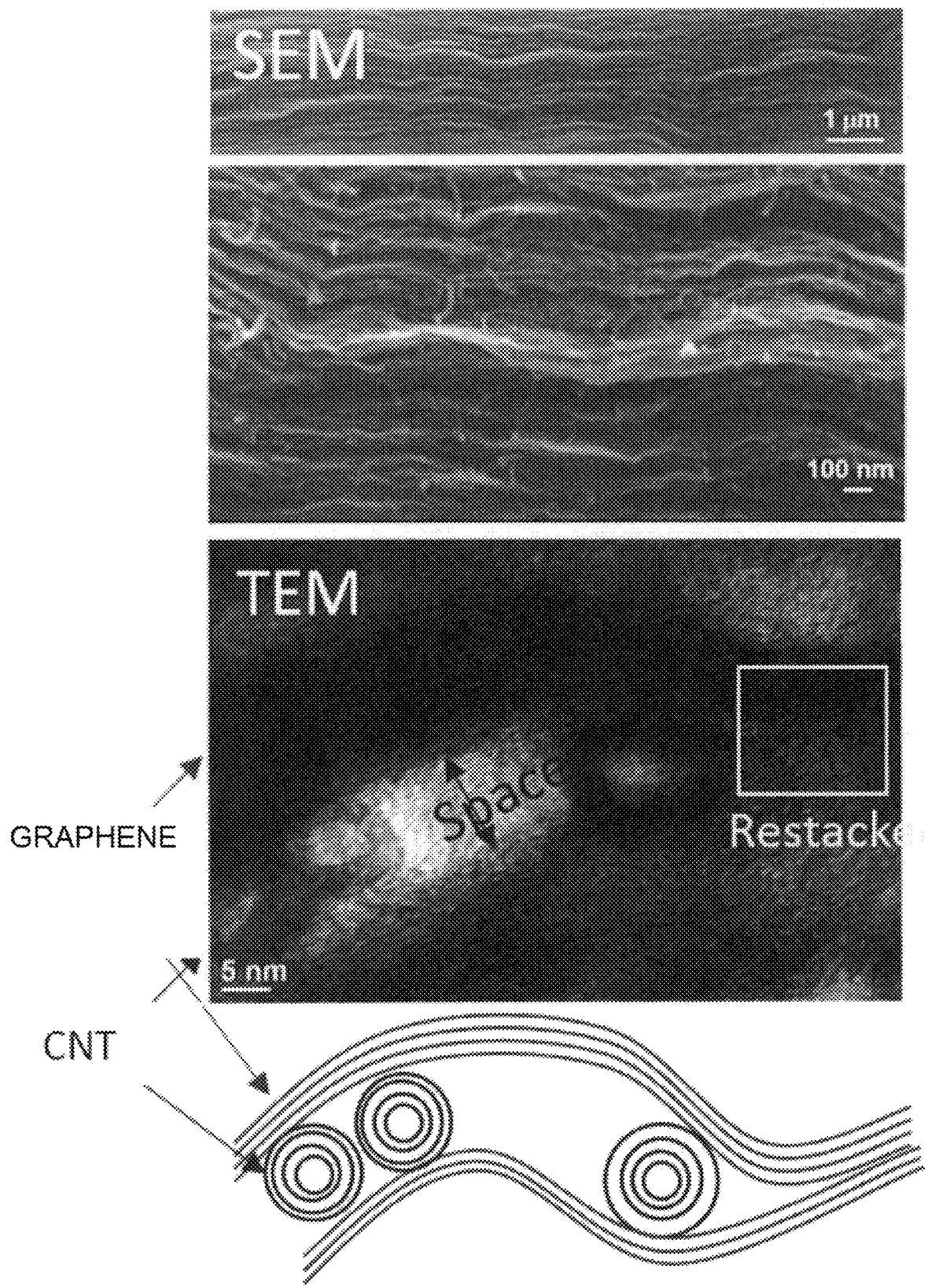
FIG. 15 shows SEM and TEM images of the stack according to Example 2.

In a manner similar to Example 1, the structure of the stack after step S330 was observed by the SEM and the TEM. The results are shown in FIG. 14 and FIG. 15.

Figure 17:
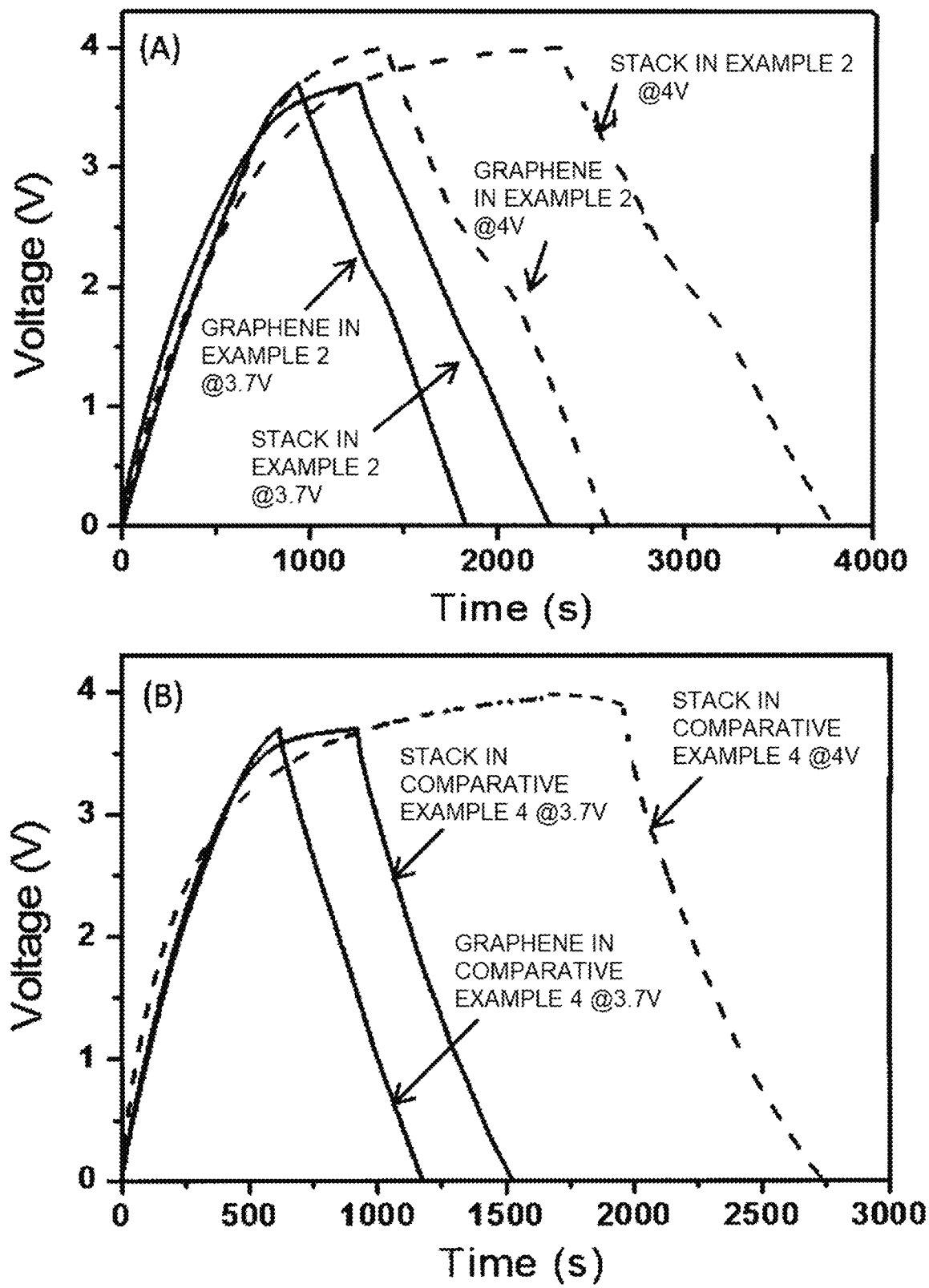
FIG. 17 is a diagram showing the charging-discharging curves when the stack in Example 2 and Comparative example 4 is used and EMI-BF$_4$ is used as the electrolyte.

In a manner similar to Example 1, the electric double-layer capacitor in which the stack after step S330 was used in the electrode was manufactured, and the CV measurement and the galvanostat charging-discharging measurement were performed at room temperature in the potential range of 0 V to 3.5 V, and thus, the specific capacity, the energy density, and the power density were calculated. The results are shown in FIG. 16, FIG. 17, and Table 3.

Example 3

In Example 3, the stack in which CNT and graphene manufactured by the thermal reduction method and provided with the pores by the heating at 800° C. were stacked was manufactured. Since Example 3 is similar to Example 1 except that the heating temperature in step S320 is set to 800° C., the description is omitted.

In a manner similar to Example 1, the morphology of the graphene after the heating in step S320 and before the stacking in step S330 was observed by the atomic resolution TEM, and thus the Raman spectrum was measured. The nitrogen adsorption-desorption isotherm by the BET method was measured, and the specific surface area and the pore diameter distribution were obtained. The results are shown in FIG. 9, FIG. 11, and Table 2.

In a manner similar to Example 1, the electric double-layer capacitor in which the graphene after the heating in step S320 and before the stacking in step S330 was used in the electrode was manufactured, and similarly, the CV measurement and the galvanostat charging-discharging measurement were performed at room temperature in the potential range of 0 V to 3.5 V, and thus, the specific capacity, the energy density, and the power density were calculated. The results are shown in Table 2.

In a manner similar to Example 1, the structure of the stack after step S330 was observed using the SEM and the TEM. The electric double-layer capacitor in which the stack after step S330 was used in the electrode was manufactured, and the CV measurement and the galvanostat charging-discharging measurement were performed at room temperature in the potential range of 0 V to 3.5 V, and thus, the specific capacity, the energy density, and the power density were calculated.

Comparative Example 4

In Comparative example 4, the stack of CNT and graphene without the pores was manufactured. In Comparative example 4, graphene manufactured by the thermal reduction method in a manner similar to Example 1 was heated in an Ar atmosphere at 650° C. for 0.5 hours. The heated graphene was dispersed in NMP, and the single-walled CNT was added and the mixture was stirred at room temperature for two hours. Here, the graphene and the CNT were dispersed so that the mass ratio of the graphene to the CNT became 10. That is to say, Comparative example 4 was similar to Example 2 except that step S310 was not carried out in Comparative example 4.

Figure 8:
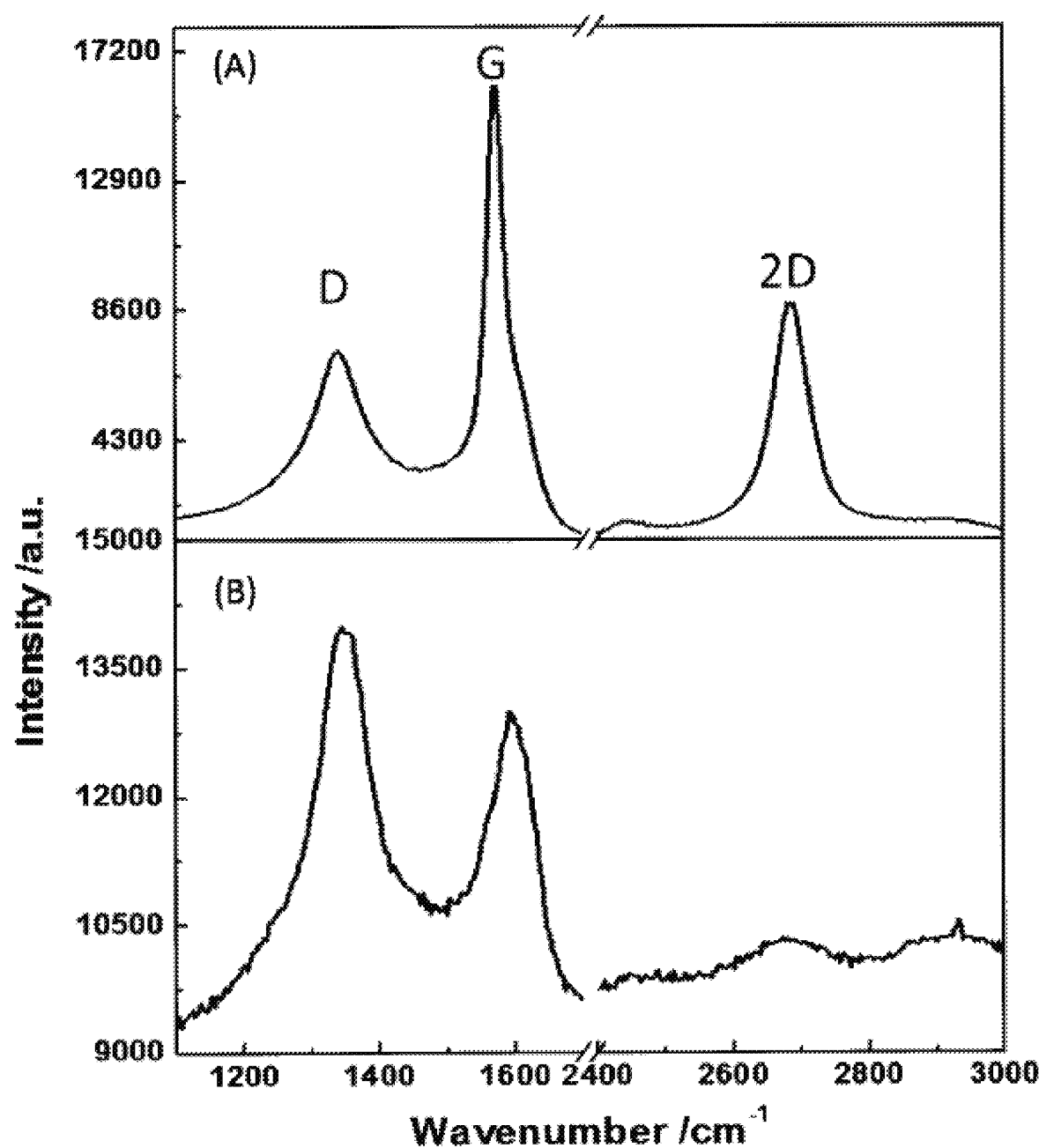
FIG. 8 is a diagram showing the Raman spectrum of the heated graphene in Example 2 and Comparative example 4.
Figure 10:
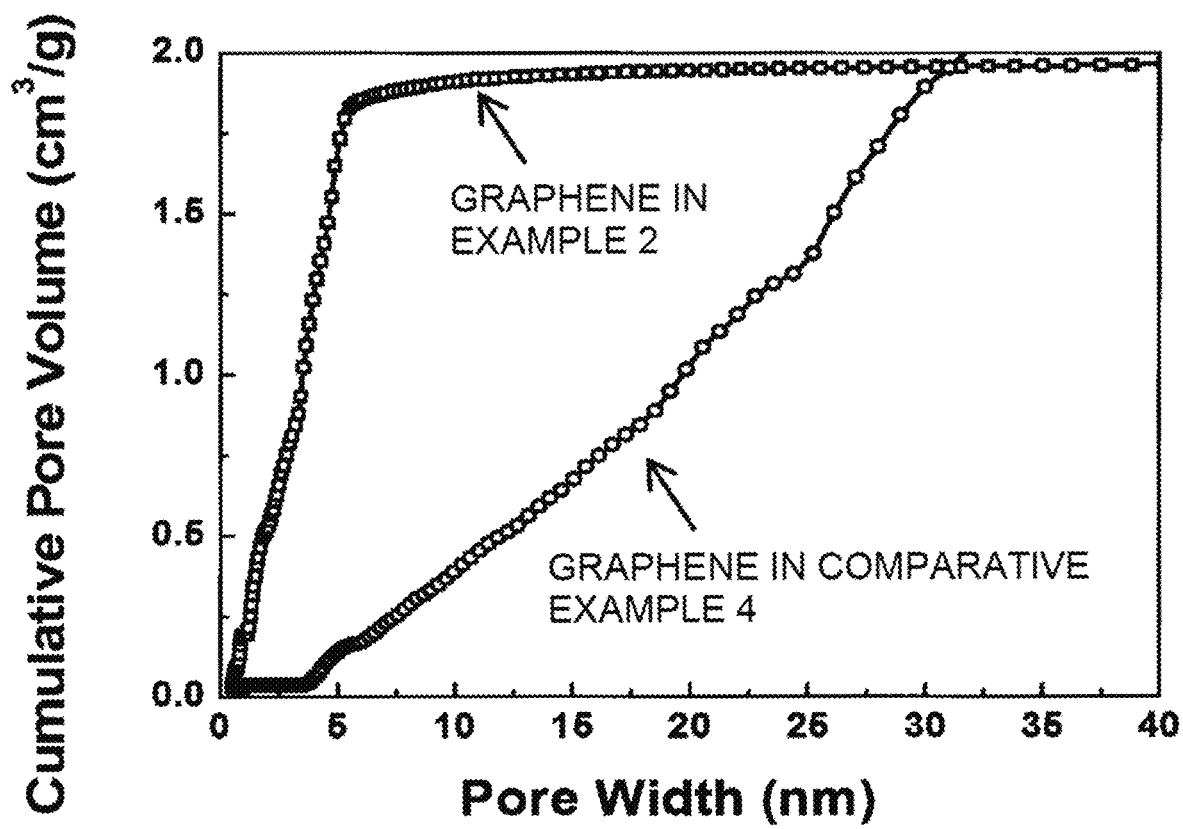
FIG. 10 is a diagram showing pore diameter distributions of the heated graphene in Example 2 and Comparative example 4.

In a manner similar to Example 1, the morphology of the graphene after the heating and before the stacking was observed by the atomic resolution TEM, and thus the Raman spectrum was measured. The nitrogen adsorption-desorption isotherm by the BET method was measured, and the specific surface area and the pore diameter distribution were obtained. The results are shown in FIG. 8, FIG. 9, FIG. 10, and Table 2.

In a manner similar to Example 1, the electric double-layer capacitor in which the graphene after the heating and before the stacking was used in the electrode was manufactured, and similarly, the CV measurement and the galvanostat charging-discharging measurement were performed at room temperature in the potential range of 0 V to 3.5 V, and thus, the specific capacity, the energy density, and the power density were calculated. The results are shown in FIG. 12, FIG. 13, and Table 2.

In a manner similar to Example 1, the structure of the stack was observed using the SEM and the TEM. The electric double-layer capacitor in which the stack after step S330 was used in the electrode was manufactured, and the CV measurement and the galvanostat charging-discharging measurement were performed at room temperature in the potential range of 0 V to 3.5 V, and thus, the specific capacity, the energy density, and the power density were calculated. The results are shown in FIG. 16, FIG. 17, and Table 3.

Comparative Example 5

Figure 18:
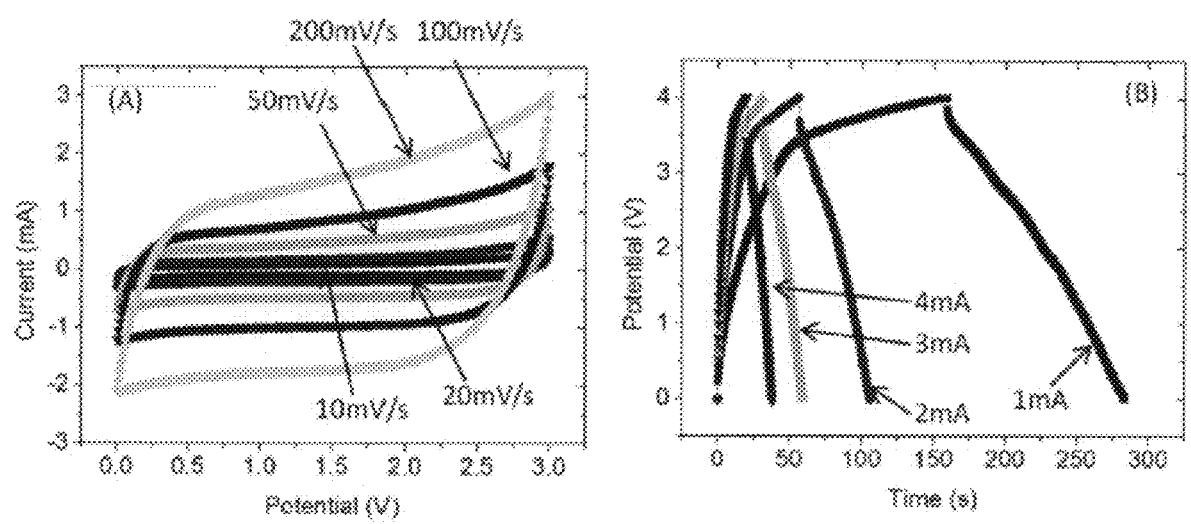
FIG. 18 is a diagram showing the specific capacity-voltage curves (CV curves) and the charging-discharging curves when a stack in Comparative example 5 is used and EMI-BF$_4$ is used as the electrolyte.

In Comparative example 5, a capacitor was manufactured in accordance with the procedure according to Example 3 described in Patent Literature 2. The capacitor was subjected to the CV measurement and the galvanostat charging-discharging measurement at room temperature in the potential range of 0 V to 3.5 V, and thus, the specific capacity, the energy density, and the power density were calculated. The results are shown in FIG. 18.

Reference Example 6

In Reference example 6, a stack of CNT and graphene in which the pores are not formed intentionally was manufactured. The graphene used in this stack was prepared as below. Into 30 mL of distilled water, oxidized graphene (100 g) manufactured by improved Hummers method in a manner similar to Example 1 was added and dispersed for 30 minutes through an ultrasonic process. This mixture was heated on a hot plate until the temperature reached 100° C., and then, hydrazine hydrate (3 mL) was added thereto and the mixture was kept at 98° C. for 24 hours so as to be reduced. Thus, black graphene was obtained. This black graphene was washed with distilled water to remove excessive hydrazine.

In a manner similar to Example 1, the graphene was dispersed in NMP and then, the single-walled CNT was added. The mixture was stirred at room temperature for two hours. Here, the graphene and the CNT were dispersed so that the mass ratio of the graphene to the CNT became 10. Thus, the stack was obtained.

Figure 19:
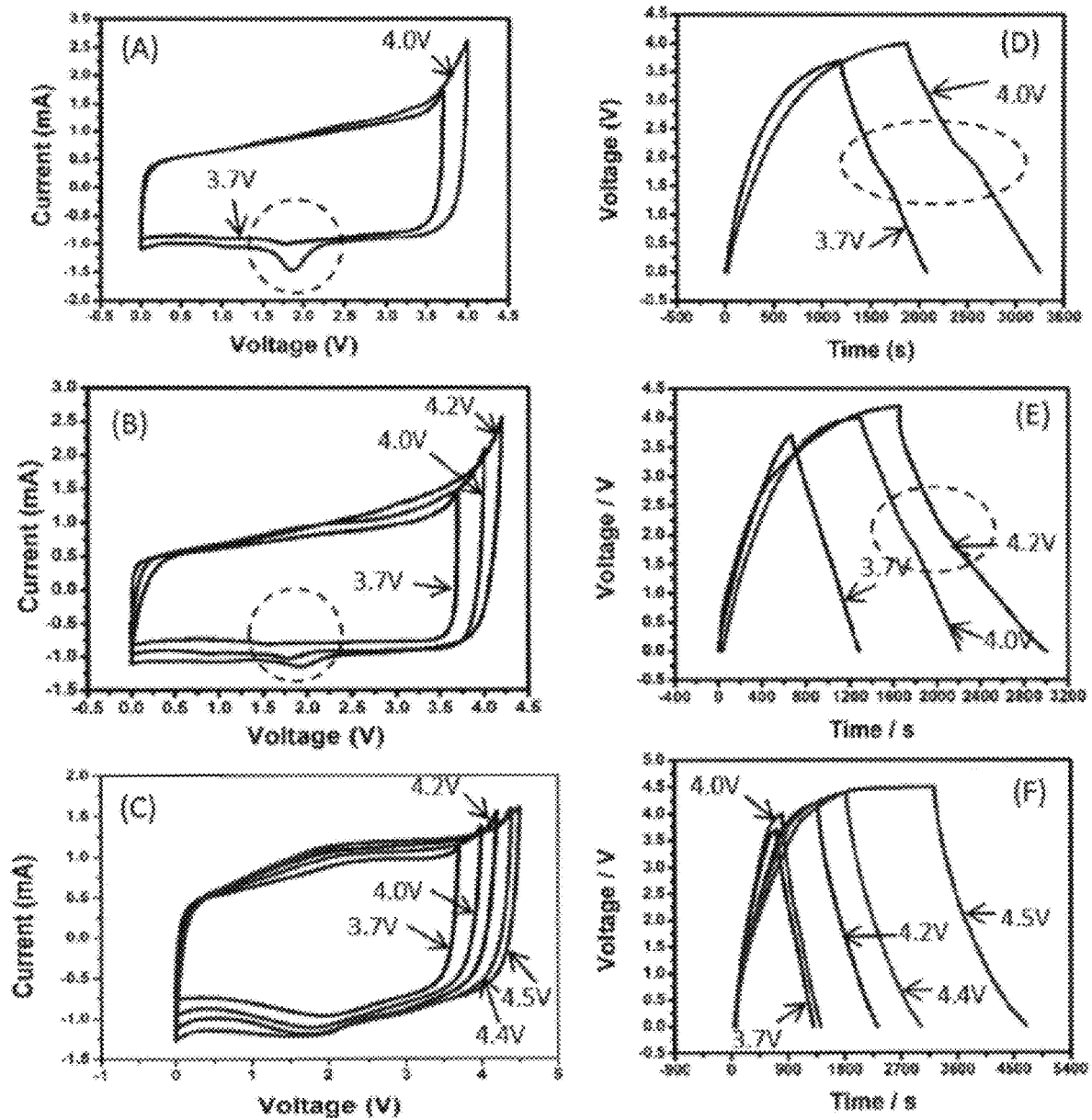
FIG. 19 is a diagram showing the specific capacity-voltage curves (CV curves) and the charging-discharging curves for various electrolytes when a stack in Reference example 6 is used.
Figure 20:
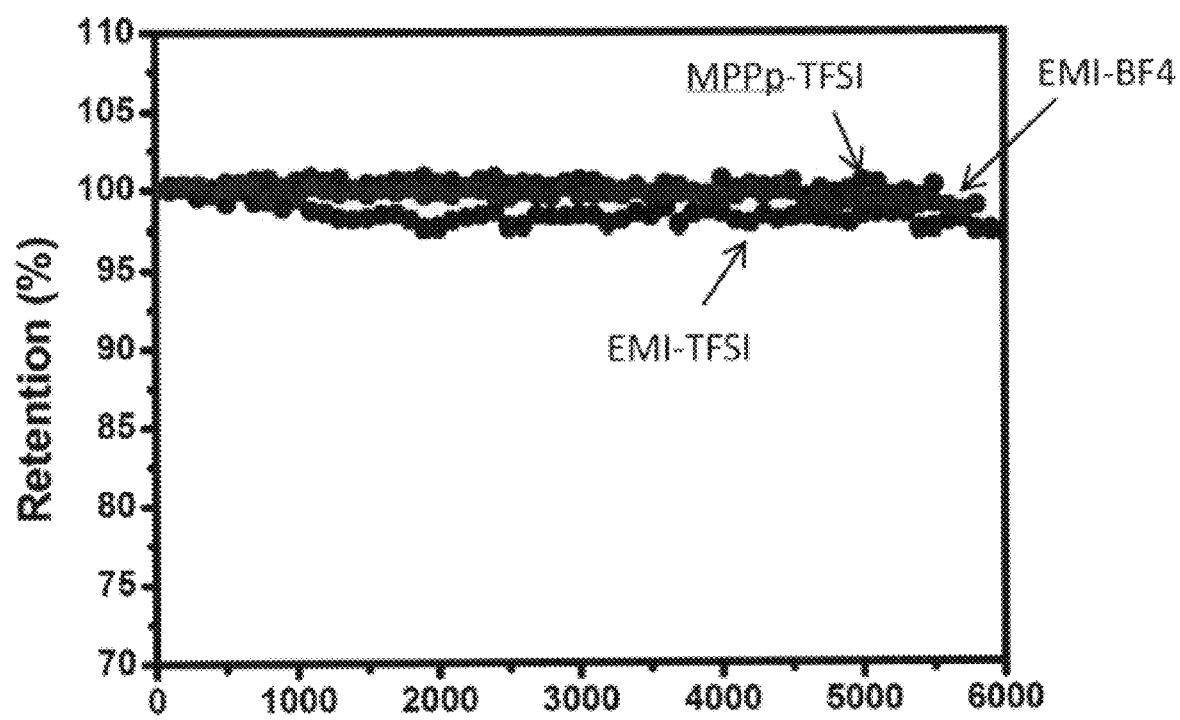
FIG. 20 is a diagram showing cycle characteristics for various electrolytes when the stack in Reference example 6 is used.

In a manner similar to Example 1, the structure of the stack was observed using the SEM and the TEM. As the electrolyte, various ionic liquids (EMI-TFSI, EMI-BF$_4$, and MPPp-TFSI) were used and thus, the electric double-layer capacitors using the stack in the electrode were manufactured. The electric double-layer capacitors were subjected to the CV measurement and the galvanostat charging-discharging measurement at room temperature in the potential range of 0 V to 3.5 V, and thus, the specific capacity, the energy density, and the power density were calculated. The results are shown in FIG. 19 and Table 4. The cycle characteristics of the electric double-layer capacitor were examined. The charging-discharging of the electric double-layer capacitor was repeated 6000 times and after each charging-discharging cycle, the change in specific capacity at a current density of 0.2 A/g was measured. The results are shown in FIG. 20.

A list of manufacturing conditions for the stacks according to Examples/Comparative examples/Reference example 1 to 6 are shown in Table 1, and the results are described in detail.

TABLE 1

List of manufacturing conditions for the stacks according to Examples/Comparative examples/Reference examples 1 to 6

| Example/Comparative example | Preparation of graphene — Thermal reduction temperature (°C) | Adsorption of MOH | | | Reaction between MOH and graphene | | | Formation of stack |
|---|---|---|---|---|---|---|---|---|
| | | MOHaq. (M) | Concentration of graphene (g/L) | Temp. (°C) | Temp. (°C) | Atmosphere | Time (H) | Mass ratio of graphene/CNT |
| 1 | 400 | KOHaq. (7M) | 10 | RT | 650 | Ar | 0.5 | 10 |
| 2 | 400 | KOHaq. (7M) | 10 | RT | 700 | Ar | 0.5 | 10 |
| 3 | 400 | KOHaq. (7M) | 10 | RT | 800 | Ar | 0.5 | 10 |
| 4 | 400 | — | — | — | 700 | Ar | 0.5 | 10 |
| 5 | Reproduction experiment of Example 3 in Patent Literature 2 (continuous electrolytic peeling + carbon nanotube) | | | | | | | 10 |
| 6 | Chemically reduced graphene + carbon nanotube | | | | | | | 10 |

FIG. 6 is an atomic resolution TEM image of the heated graphene in Example 1.

Figure 7:
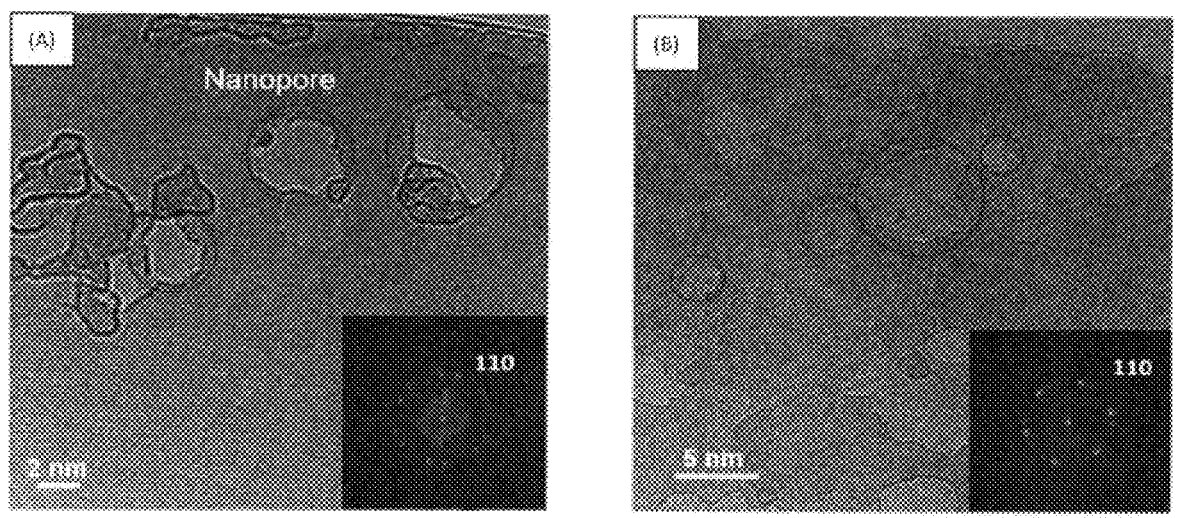
FIG. 7 is an atomic resolution TEM image of the heated graphene in Example 2.

FIG. 7 is an atomic resolution TEM image of the heated graphene in Example 2.

In FIG. 6 and FIG. 7, the graphene has a pore diameter of 0.4 nm or more and 10 nm or less. It has been confirmed that the graphene includes a graphene sheet of one or more and three or less layers. Although not shown, the heated graphene in Example 3 and Example 4 exhibited the similar atomic resolution TEM image. From the above results, it has been confirmed that the graphene including the graphene sheet with a pore diameter of 0.4 nm or more and 10 nm or less can be obtained by steps S310 and S320 according to the present invention.

FIG. 8 is a diagram expressing the Raman spectrum of the heated graphene in Example 2 and Comparative example 4.

FIG. 8(A) shows the Raman spectrum of the heated graphene in Example 2, and FIG. 8(B) shows the Raman spectrum of the heated graphene in Comparative example 4. According to the Raman spectrum in FIG. 8(A), three remarkable peaks appeared at 1340 cm$^{-1}$ in a D band, 1590 cm$^{-1}$ in a G band, and 2680 cm$^{-1}$ in 2D band. On the other hand, in the Raman spectrum in FIG. 8(B), the peaks also appeared in the D band and the G band; however, the intensity of these peaks was lower than that of FIG. 8(A), and the half-value width was larger. In addition, in the Raman spectrum in FIG. 8(B), the clear peak was not observed in the 2D band. These results indicate that the crystallinity of the graphene remarkably improves by steps S310 and S320 according to the present invention. Although not shown, the Raman spectrum of the heated graphene in Example 1 and Example 3 was similar to that of FIG. 8(A).

FIG. 9 is a diagram showing nitrogen adsorption-desorption isotherms of the heated graphene in Examples and Comparative example 1 to 4.

FIG. 9 indicates that all graphene exhibits the hysteresis and includes the pores. The BET specific surface area was calculated from the nitrogen adsorption-desorption isotherm, and the results show that the specific surface area (m$^2$/g) in Examples and Comparative example 1 to 4 are 1400, 3100, 900, and 710, respectively. The specific surface area in Example 3 is smaller than that in Example 2, and this fact indicates that since the heating temperature in Example 3 is higher than that in Example 2, the reaction and burning progress excessively so that it becomes difficult to control the pores, for example, the pores are connected to each other. Thus, it has been understood that in step S320 in the present invention, the large specific surface area is achieved by the heating in the temperature range of 650° C. or more and 800° C. or less, the large specific surface area is achieved for sure by the heating in the temperature range of 650° C. or more and 750° C. or less, and the very large specific surface area is achieved by the heating in the temperature range of 675° C. or more and 725° C. or less.

FIG. 10 is a diagram showing the pore diameter distributions of the heated graphene in Example 2 and Comparative example 4.

FIG. 11 is a diagram showing the pore diameter distributions of the heated graphene in Examples 1 to 3.

FIG. 10 and FIG. 11 indicate that the heated graphene in Examples 1 to 3 has a pore diameter of 0.4 nm or more and 10 nm or less. In particular, the heated graphene in Example 2 includes mainly the pores with a diameter of 2 nm or more and 4 nm or less, and allows more electrolyte solution ions to pass.

FIG. 12 is a diagram showing the specific capacity-voltage curves (CV curves) and the charging-discharging curves when the heated graphene in Example 2 and Comparative example 4 was used and EMI-BF$_4$ was used as the electrolyte.

FIG. 13 is a diagram showing the specific capacity-voltage curves (CV curves) and the charging-discharging curves when the heated graphene in Example 2 and Comparative example 4 was used and KOH was used as the electrolyte.

In the CV curves in FIG. 12 and FIG. 13, the sweeping rate was 50 mV/s. Even if the heated graphene in Example 2 and Comparative example 4 was used, the rectangular CV curve expressing the ideal electric double-layer capacitor was exhibited. However, the capacitance of the electric double-layer capacitor by the heated graphene in Example 2 was much higher than that in Comparative example 4. Although not shown, this tendency was observed similarly in the CV curve of the heated graphene in Example 1 and Example 3.

On the basis of the CV curve (electrolyte solution: EMI-BF$_4$, voltage: 3.7 V), the specific capacity (F/g) in Examples and Comparative example 1 to 4 was calculated, and the results were 135, 195, 154, and 120, respectively. For example, the comparison between Example 2 and Comparative example 4 indicates that the specific capacity is improved by 63% when the electrolyte solution is EMI-BF$_4$, and improved by 44% when the electrolyte solution is KOH.

In FIG. 12 and FIG. 13, the charging-discharging curve expresses the typical constant-current charging-discharging curve for the electric double-layer capacitor. The charging-discharging curve in the case where the heated graphene in Example 2 was used indicates that the discharging time is much longer than that in Comparative Example 4. Although not shown, this tendency was similarly observed in the charging-discharging curve when the heated graphene in Example 1 and Example 3 was used. On the basis of the obtained specific capacity, the energy density and the power density were calculated. As shown in Table 2, it is understood that the energy density and the output density are both improved when the graphene with the pores is used for the electrode material as compared to when the graphene without the pores is used for the electrode material.

TABLE 2

List of graphene characteristics in Examples/Comparative examples 1 to 4 (@3.7 V, EMI-BF4)

| Example/ Comparative example | BET specific surface area ($m^2$/g) | Specific capacity (F/g) | Energy density (Wh/kg) | Power density (kW/kg) |
|---|---|---|---|---|
| 1 | 1400 | 135 | 65 | 436 |
| 2 | 3100 | 195 | 93 | 488 |
| 3 | 900 | 154 | 74 | 370 |
| 4 | 710 | 120 | 56 | 320 |

The above results indicate that the electric characteristics of graphene are remarkably improved by using the graphene with the pores formed by steps S310 and S320 according to the present invention. This indicates that the graphene has the large specific surface area due to the pores and the electrolyte solution ions pass the graphene because of the diffused pores.

FIG. 14 shows TEM images of the stack according to Example 2.

FIG. 15 shows SEM and TEM images of the stack according to Example 2.

FIG. 14 and FIG. 15 indicate that the layers of graphene are stacked with the CNT interposed therebetween, and between the layers, there is a place where the graphene and the space are in close contact. Thus, it is understood that the distance between the layers is 0.4 nm (corresponding to the close contact portion) or more and 10 nm or less. The CNT is dispersed and not in a bundle form. Although not shown, the stacks according to Examples 1 and 3 are similar except the form of pores provided in the graphene.

FIG. 16 is a diagram showing the specific capacity-voltage curves (CV curves) in a case where the stacks according to Example 2 and Comparative example 4 are used and the electrolyte is EMI-BF$_4$.

FIG. 17 is a diagram showing the charging-discharging curves in a case where the stacks according to Example 2 and Comparative example 4 are used and the electrolyte is EMI-BF$_4$.

In each of the CV curves in FIG. 16, the sweeping rate is 50 mV/s. Each of the stacks according to Example 2 and Comparative example 4 exhibited a rectangular CV curve expressing an ideal electric double-layer capacitor. The capacitance of the electric double-layer capacitor by the stacks according to Example 2 and Comparative example 4 is higher than that of the heated graphene in Example 2 and Comparative example 4. Thus, it has been demonstrated that stacking the layers leads to higher capacitance. Although not shown, this tendency was observed similarly in the CV curves of the stacks according to Example 1 and Example 3.

On the basis of the CV curve (electrolyte solution: EMI-BF$_4$, voltage: 3.7 V, 4 V), the specific capacity (F/g) of the stack according to Example 2 was calculated and the result was 221 (@3.7 V) and 292 (@4 V). On the other hand, the specific capacity of the stack according to Comparative example 4 was calculated and the result was 134 (@3.7 V) and 156 (@4 V). The comparison between Example 2 and Comparative example 4 indicates that the specific capacity of the stack according to Example 2 was remarkably higher than that of Comparative example 4 when the electrolyte solution was EMI-BF$_4$.

Each charging-discharging curve in FIG. 17 expressed the typical constant-current charging-discharging curve for the electric double-layer capacitor. The charging-discharging curve in the case where the stack according to Example 2 was used expressed that the discharging time was much longer than that in the case where the heated graphene according to Example 2 was used. In addition, the charging-discharging curve in the case where the stack according to Example 2 was used expressed that the discharging time was much longer than that of Comparative example 4. Although not shown, this tendency was similarly observed in the charging-discharging curve of the heated graphene in Example 1 and Example 3. On the basis of the obtained specific capacity, the energy density and the power density were calculated. As shown in Table 4, when the stack of the CNT and the graphene with the pores is used as the electrode material, the energy density and the output density are both improved as compared to the case in which the graphene with the pores is used as the electrode material and moreover to the case in which the stack of the CNT and the graphene without the pores is used as the electrode material.

TABLE 3

List of characteristics of stacks according to Example 2, and Comparative examples 4, 5 (EMI-BF4)

| Example/ Comparative example | Specific capacity (F/g) | | Energy density (Wh/kg) | | Power density (kW/kg) | |
|---|---|---|---|---|---|---|
| | 3.7 V | 4 V | 3.7 V | 4 V | 3.7 V | 4 V |
| 2 | 221 | 292 | 105 | 162 | 540 | 589 |
| 4 | 134 | 156 | 64 | 87 | 203 | 257 |
| 5 | 133.1 | — | 73.9 | — | 159.8 | — |

The above results have shown that the stack including the CNT and the graphene with the pores formed by steps S310 to S330 according to the present invention functions as the electrode material that largely improves the electric characteristics and that has an energy density as high as 100 Wh/kg or more and a power density as high as 500 kW/kg or more. Thus, this stack can provide the electric double-layer capacitor with the high energy density and the high power density. This is because the graphene has the large specific surface area due to the pores, and the electrolyte solution ions pass the pores to penetrate the stack and diffuse therein.

FIG. 18 shows the specific capacity-voltage curves (CV curves) and the charging-discharging curves in the case where the stack according to Comparative example 5 is used and EMI-BF$_4$ is used as the electrolyte.

The comparison between the CV curve at a sweeping speed of 50 mV/s in FIG. 18(A) and that of the stack according to Example 2 in FIG. 16(A) indicates that the specific capacity of the stack according to Example 2 is much higher than that of the stack according to Comparative example 5. The comparison between the charging-discharging curves in FIG. 18(B) and FIG. 17(A) indicates that the discharging time of the stack according to Example 2 is much longer than that of the stack according to Comparative example 5.

The above results show that employing the thermal reduction method in steps S410 to S420 in the manufacturing method by steps S310 to S330 according to the present invention is very preferable to manufacture the stack of the CNT and the graphene with the pores.

FIG. 19 is a diagram showing the specific capacity-voltage curves (CV curves) and the charging-discharging curves for various electrolytes by using the stack according to Reference example 6.

FIG. 19(A) to FIG. 19(C) express the CV curves when the electrolyte is EMI-TFSI, EMI-BF$_4$, and MPPp-TFSI, respectively. FIG. 19(D) to FIG. 19(F) express the charging-discharging curves when the electrolyte is EMI-TFSI, EMI-BF$_4$, and MPPp-TFSI, respectively.

In FIG. 19(A) and FIG. 19(B), the peaks are observed in a region shown by a dotted line when the application voltage is 4 V or more. In FIG. 19(D) and FIG. 19(E), inflection points are observed in a region shown by a dotted line when the application voltage is 4 V or more. These results indicate that when the application voltage is 4 V or more, the electrode and the electrolyte (ionic liquid) react with each other. In a case of using the ionic liquid as the electrolyte, it is desirable to consider the application voltage and the reaction with the electrode material. As shown in FIG. 19(C) and FIG. 19(F), since the reaction with the stack of the graphene and the CNT does not occur when the application voltage is 4 V or more, it is suggested that MPPp-TFSI is preferable as the electrolyte.

FIG. 20 shows cycle characteristics for various electrolytes when the stack in Reference example 6 is used.

According to FIG. 20, no matter what electrolyte is used, a capacity retention as high as 97% or more was obtained even after 5000 cycles at a current density of 0.2 A/g. This indicates that the electric double-layer capacitor that includes the electrode formed of the stack of the graphene and the CNT and the ionic liquid as the electrolyte is preferable.

In addition, Table 4 shows the results of calculating the energy density and the specific capacity at each voltage from FIG. 19. It is understood that in the case of operating at an application voltage of 4 V or less, using the EMI-TFSI as the electrolyte can achieve the high specific capacity and the high energy density, and in the case of operating at an application voltage of 4.5 V or more, using the MPPp-TFSI as the electrolyte can achieve the high specific capacity and the high energy density. It is suggested that the space between the layers has expanded by the application voltage and EMI-TFSI or EMI-BF$_4$ failed to withstand such a high application voltage. That is to say, by selecting the appropriate electrolyte in accordance with the application voltage (operating voltage) of the capacitor, it is possible to maximally enhance the capacitor characteristics such as the electrostatic capacitance, the energy density, and the power density.

Thus, it is understood that although the stack of the CNT and the graphene either with or without the pores is used as the electrode in Reference example 6, the similar effect can be obtained also when the stack of the CNT and the graphene with the pores is used as the electrode.

TABLE 4

List of characteristics of graphene according to Reference example 6

| Voltage (V) | Ionic liquid | Specific capacity (F/g) | Energy density (Wh/kg) | Power density (kW/kg) |
|---|---|---|---|---|
| 3.7 | EMI-TFSI | 243 | 112 | 343 |
|  | EMI-BF4 | 174 | 81 | 266 |
|  | MPPp-TFSI | 151 | 69 | 41 |
| 4.0 | EMI-TFSI | 332 | 156 | 395 |
|  | EMI-BF4 | 197 | 105 | 334 |
|  | MPPp-TFSI | 146 | 78 | 48 |
| 4.2 | EMI-BF4 | 260 | 145 | 360 |
|  | MPPp-TFSI | 217 | 129 | 54 |
| 4.5 | MPPp-TFSI | 314 | 216 | 57 |

INDUSTRIAL APPLICABILITY

By the manufacturing method according to the present invention, the stack of the CNT and the graphene with the pores having the excellent capacitor characteristic can be obtained. The electric double-layer capacitor including the stack in the electrode is advantageous in wind power generation, electric vehicles, and the like. If a functional biomolecule such as DNA, enzyme, or antibody is held in the pores of graphene or in the space between the layers of graphene, the stack can form a sensor using the functional biomolecule as a sensing element.

REFERENCE SIGNS LIST

100 Stack
110 Graphene
120 Carbon nanotube
130 Pore
140 Functional group
500 Electric double-layer capacitor
510 Positive electrode
520 Negative electrode
530 Electrolyte
540 Separator
550 Cell

The invention claimed is:

1. A method for manufacturing a stack consisting of graphene and carbon nanotubes, comprising:
    a step of dispersing the graphene in an aqueous MOH solution, wherein M represents an element selected from a group consisting of Li, Na, and K, to adsorb MOH on the graphene;
    a step of heating the graphene with MOH adsorbed thereon that is obtained in the adsorption step in vacuum or in an inert atmosphere in a temperature range of 400° C. or more and 900° C. or less to form pores in the graphene;
    a step of dispersing the carbon nanotubes and the graphene with the pores that are obtained in the step of forming the pores in a dispersion medium to stack the carbon nanotubes and the graphene with the pores; and
    a step of removing the dispersion medium.

2. The method according to claim 1, wherein in the step of forming the pores, the graphene with MOH adsorbed thereon is heated in a temperature range of 650° C. or more and 800° C. or less for 10 minutes or more and 3 hours or less.

3. The method according to claim 2, wherein in the step of forming the pores, the graphene with MOH adsorbed thereon is heated in a temperature range of 650° C. or more and 750° C. or less.

4. The method according to claim 3, wherein in the step of forming the pores, the graphene with MOH adsorbed thereon is heated in a temperature range of 675° C. or more and 725° C. or less.

5. The method according to claim 1, further comprising prior to the adsorption step:
a step of freeze-drying an oxidized graphene dispersion liquid in which oxidized graphene is dispersed in water; and
a step of thermally reducing the oxidized graphene dispersion liquid that is freeze-dried in a temperature range of 300° C. or more and 700° C. or less for 1 second or more and 10 minutes or less to prepare graphene including a graphene sheet of one or more and three or less layers.

6. The method according to claim 1, wherein in the adsorption step, the aqueous MOH solution has a molarity of 5 M or more and 10 M or less.

7. The method according to claim 6, wherein in the adsorption step, the graphene is dispersed so that the graphene in the aqueous MOH solution has a concentration of 5 g/L or more and 20 g/L or less.

8. The method according to claim 1, wherein in the adsorption step, the aqueous MOH solution with the graphene dispersed therein is stirred at room temperature for 12 hours or more and 30 hours or less.

9. The method according to claim 1, wherein in the stacking step, the graphene and the carbon nanotubes are dispersed so that a mass ratio of the graphene to the carbon nanotubes (graphene/carbon nanotubes) is in a range of 1 or more and 50 or less.

10. The method according to claim 9, wherein in the stacking step, the graphene and the carbon nanotubes are dispersed so that the mass ratio of the graphene to the carbon nanotubes (graphene/carbon nanotubes) is in a range of 5 or more and 15 or less.

11. The method according to claim 1, wherein in the stacking step, the dispersion medium is selected from a group consisting of water, N-methylpyrrolidone (NMP), N,N-dimethylformamide (DMF), and dimethyl sulfoxide (DMSO).

12. An electrode material consisting of a stack consisting of graphene and carbon nanotubes, wherein
the graphene includes pores through which electrolyte solution ions pass, and
layers of the graphene are stacked with the carbon nanotubes interposed therebetween at intervals that enable the electrolyte solution ions to pass.

13. The electrode material according to claim 12, wherein the graphene includes a graphene sheet of one or more and three or less layers, and includes pores with a pore diameter of 0.4 nm or more and 10 nm or less.

14. The electrode material according to claim 12, wherein the stack has a specific capacity in a range of 200 F/g or more and 400 F/g or less.

15. The electrode material according to claim 12, wherein the graphene includes a carboxylic group and/or a hydroxyl group.

16. An electric double-layer capacitor comprising an electrode and an electrolyte, wherein
the electrode includes the electrode material according to claim 12.

17. The electric double-layer capacitor according to claim 16, wherein the electrolyte is M'OH, wherein M' is an alkali metal, or an ionic liquid selected from the group consisting of EMI-TFSI, EMI-BF$_4$, and MPPp-TFSI.

18. The electric double-layer capacitor according to claim 17, wherein the electrolyte is EMI-TFSI and an application voltage is 4 V or less.

19. The electric double-layer capacitor according to claim 17, wherein the electrolyte is MPPp-TFSI and an application voltage is 4.5 V or more.

* * * * *